US009460317B2

(12) United States Patent
Nimura et al.

(10) Patent No.: US 9,460,317 B2
(45) Date of Patent: Oct. 4, 2016

(54) DATA PROCESSOR AND STORAGE MEDIUM

(75) Inventors: Kazuaki Nimura, Kawasaki (JP);
Kouichi Yasaki, Kawasaki (JP);
Yousuke Nakamura, Kawasaki (JP);
Zhaogong Guo, Kawasaki (JP); Isamu Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 706 days.

(21) Appl. No.: 12/903,037

(22) Filed: Oct. 12, 2010

(65) Prior Publication Data

US 2011/0087748 A1 Apr. 14, 2011

(30) Foreign Application Priority Data

Oct. 14, 2009 (JP) .................................. 2009-237587

(51) Int. Cl.
*G06F 15/16* (2006.01)
*G06F 21/78* (2013.01)
*G06F 21/88* (2013.01)

(52) U.S. Cl.
CPC ............... *G06F 21/78* (2013.01); *G06F 21/88* (2013.01)

(58) Field of Classification Search
CPC ........................... G06Q 10/107; H04L 12/585
USPC ........................................................ 709/206
See application file for complete search history.

(56) References Cited

U.S. PATENT DOCUMENTS

| 6,438,550 B1* | 8/2002 | Doyle et al. .................... 726/2 |
| 7,143,069 B2* | 11/2006 | Lacivita ................. G06Q 20/04 705/44 |
| 7,561,019 B2 | 7/2009 | Sasakura et al. |
| 7,908,401 B2* | 3/2011 | Chang ........................... 709/250 |
| 2001/0056539 A1* | 12/2001 | Pavlin ................... G06F 21/123 713/193 |
| 2002/0069363 A1* | 6/2002 | Winburn ................ G06F 21/64 726/4 |
| 2002/0087479 A1* | 7/2002 | Malcolm ............... G06F 21/606 705/64 |
| 2003/0018815 A1* | 1/2003 | Spicer ................. H04L 12/5835 709/246 |
| 2003/0135565 A1* | 7/2003 | Estrada ................ G06Q 10/107 709/206 |
| 2003/0188117 A1* | 10/2003 | Yoshino .................. G06F 21/78 711/164 |

(Continued)

FOREIGN PATENT DOCUMENTS

| JP | 10-207779 A | 8/1998 |
| JP | 2002-116969 A | 4/2002 |

(Continued)

OTHER PUBLICATIONS

Ironkey et al. ("https://www.ironkey.com/news/ironkey-protection-from-unsecure-computers" Dec. 18, 2008).*

(Continued)

*Primary Examiner* — Razu A Miah
(74) *Attorney, Agent, or Firm* — Oblon, McClelland, Maier & Neustadt, L.L.P

(57) ABSTRACT

A non-transitory computer-readable medium for recording a program allowing a computer to execute: determining whether first identification information of the computer matches with second identification information stored in the computer-readable medium connected to the computer; executing a process stored in the computer-readable medium upon the determining that the first identification information and the second identification information do not match; selecting a communication unit from one or a plurality of communication units included in the computer; and transmitting third information regarding the execution of the process using the selected communication unit.

11 Claims, 17 Drawing Sheets

(56) References Cited

U.S. PATENT DOCUMENTS

| | | | |
|---|---|---|---|
| 2004/0225645 A1* | 11/2004 | Rowney | G06F 17/30516 |
| 2005/0144181 A1* | 6/2005 | Kii et al. | 707/100 |
| 2005/0242944 A1* | 11/2005 | Bankert | G08B 27/001 340/531 |
| 2006/0046711 A1* | 3/2006 | Jung | G08B 29/188 455/423 |
| 2006/0173980 A1* | 8/2006 | Kobayashi et al. | 709/222 |
| 2006/0234679 A1* | 10/2006 | Matsumoto et al. | 455/411 |
| 2006/0253620 A1* | 11/2006 | Kang | 710/36 |
| 2007/0061424 A1* | 3/2007 | Mattaway | G06Q 30/00 709/219 |
| 2008/0003944 A1* | 1/2008 | Ahlgren | 455/41.1 |
| 2008/0009268 A1* | 1/2008 | Ramer | G06F 17/30867 455/412.1 |
| 2008/0022396 A1 | 1/2008 | Kado | |
| 2008/0263363 A1* | 10/2008 | Jueneman et al. | 713/184 |
| 2008/0263371 A1* | 10/2008 | Weissman et al. | 713/193 |
| 2009/0150631 A1* | 6/2009 | Wilsey | G06F 12/1408 711/163 |
| 2009/0160658 A1* | 6/2009 | Armstrong | G06F 17/241 340/573.1 |
| 2009/0183256 A1* | 7/2009 | Mo et al. | 726/21 |
| 2009/0249460 A1* | 10/2009 | Fitzgerald et al. | 726/7 |
| 2009/0254572 A1* | 10/2009 | Redlich | G06Q 10/06 |
| 2010/0058073 A1* | 3/2010 | Ng et al. | 713/193 |
| 2010/0070880 A1* | 3/2010 | Chinta | 715/752 |
| 2010/0125463 A1* | 5/2010 | Stagl | 705/3 |
| 2010/0138298 A1* | 6/2010 | Fitzgerald et al. | 705/14.53 |
| 2010/0141997 A1* | 6/2010 | Suzuki | 358/1.15 |
| 2010/0207721 A1* | 8/2010 | Nakajima | G06F 21/552 340/5.3 |
| 2010/0229220 A1* | 9/2010 | Tsai | 726/4 |
| 2011/0113235 A1* | 5/2011 | Erickson | 713/152 |
| 2013/0317704 A1* | 11/2013 | Fischer et al. | 701/49 |

FOREIGN PATENT DOCUMENTS

| | | |
|---|---|---|
| JP | 2007-323149 A | 12/2007 |
| JP | 2008-181348 A | 8/2008 |
| JP | 2009-181176 A | 8/2009 |
| WO | WO 2004/086328 A1 | 10/2004 |

OTHER PUBLICATIONS

Ironkey-1 et al. (https://www.ironkey.com "ironkey personal user guide 2008").*

"Fujitsu Develops Secure USB Memory Device Featuring Automatic Data-Erase Function", Apr. 17, 2009.

Japanese Office Action mailed Aug. 6, 2013 for corresponding Japanese Application No. 2009237587, with Partial English-language Translation.

* cited by examiner

FIG. 4

| COMMUNICATION UNIT | | CONNECTION DESTINATION |
|---|---|---|
| WWAN | THROUGH VPN | www.yyy.com |
| | WITHOUT THROUGH VPN | www.xxx.com |
| LAN | THROUGH VPN | www.yyy.com |
| | WITHOUT THROUGH VPN | www.zzz.com |
| WLAN | THROUGH VPN | www.aaa.com |
| | WITHOUT THROUGH VPN | www.xxx.com |

21d

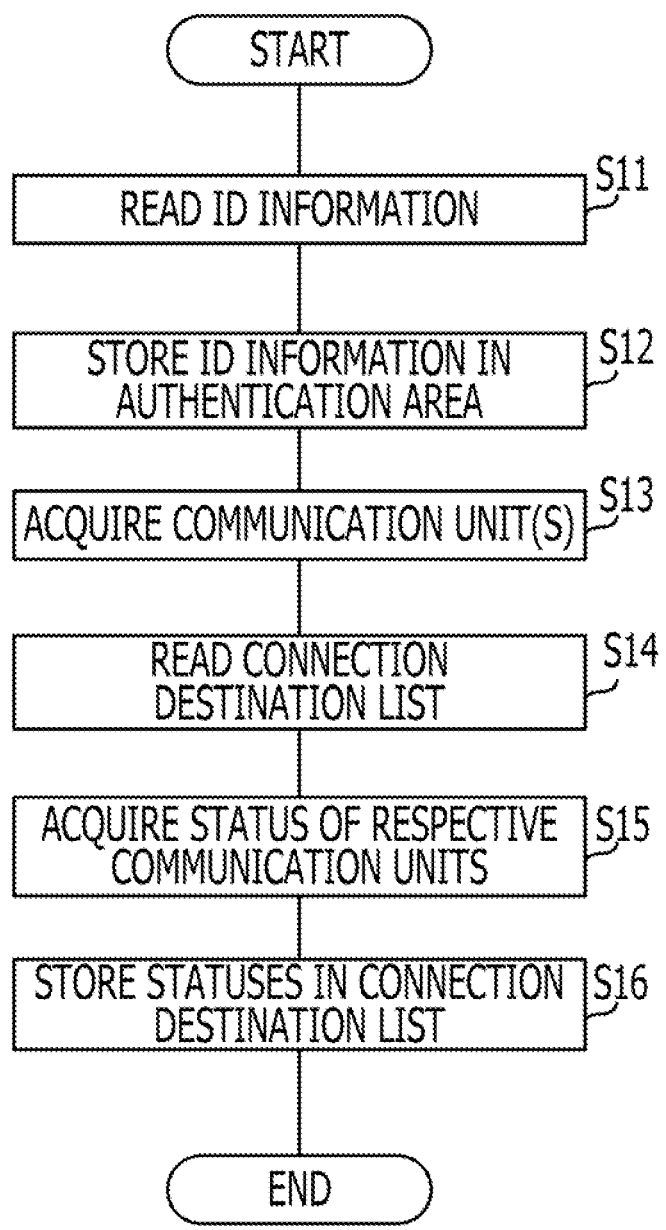

DATA PROCESSOR AND STORAGE MEDIUM

CROSS-REFERENCE TO RELATED APPLICATIONS

This application is based upon and claims the benefit of priority of the prior Japanese Patent Application No. 2009-237587, filed on Oct. 14, 2009, the entire contents of which are incorporated herein by reference.

FIELD

The embodiments discussed herein are related to a storage medium storing a program that notifies the execution of a certain process applied to data stored in the storage medium and a data processor thereof.

BACKGROUND

A storage medium such as a Hard Disk Drive (HDD) and a memory are connected to a data processor such as a personal computer and a mobile phone. Some of the data processors permit certain users to read data stored in the storage device. Such data processor prevents data leakage, for example, by performing a user authentication, thereby prohibiting unauthorized users from reading data stored in the storage device. The storage device connected to the data processor may be removed from the data processor and may be connected to another data processor that does not perform a user authentication. In this case, data stored in the storage device may be read by the data processor that does not perform a user authentication and may be leaked to an unauthorized user. Moreover, even if data stored in the storage device is encrypted and a password is set, the password may be analyzed and thereby the data may be decrypted after the storage device is connected to another data processor.

Fujitsu Laboratories' "Fujitsu Develops Secure USB Memory Device Featuring Automatic Data-Erase Function" Apr. 17, 2009 press release discusses a storage device that performs a leakage prevention process such as erasing data stored on the storage device when the storage device is connected to a data processor that is different from a registered data processor. Japanese Laid-open Patent Publication No. 2007-323149 discusses a storage device that notifies the occurrence of unauthorized access to an external device when the unauthorized accesses to a storage device from an unregistered data processor reaches or exceeds a specified number of times.

SUMMARY

According to an aspect of the invention, there is provided a non-transitory computer-readable medium for recording a program allowing a computer to execute: determining whether first identification information of the computer matches with second identification information stored in the computer-readable medium connected to the computer; executing a process stored in the computer-readable medium upon the determining that the first identification information and the second identification information do not match; selecting a communication unit from one or a plurality of communication units included in the computer; and transmitting third information regarding the execution of the process using the selected communication unit.

The object and advantages of the invention will be realized and attained by at least the features, elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a record layout of a connection destinations list;

FIG. 7 is a flowchart illustrating a registration process;

DESCRIPTION OF EMBODIMENTS

Figure 1:
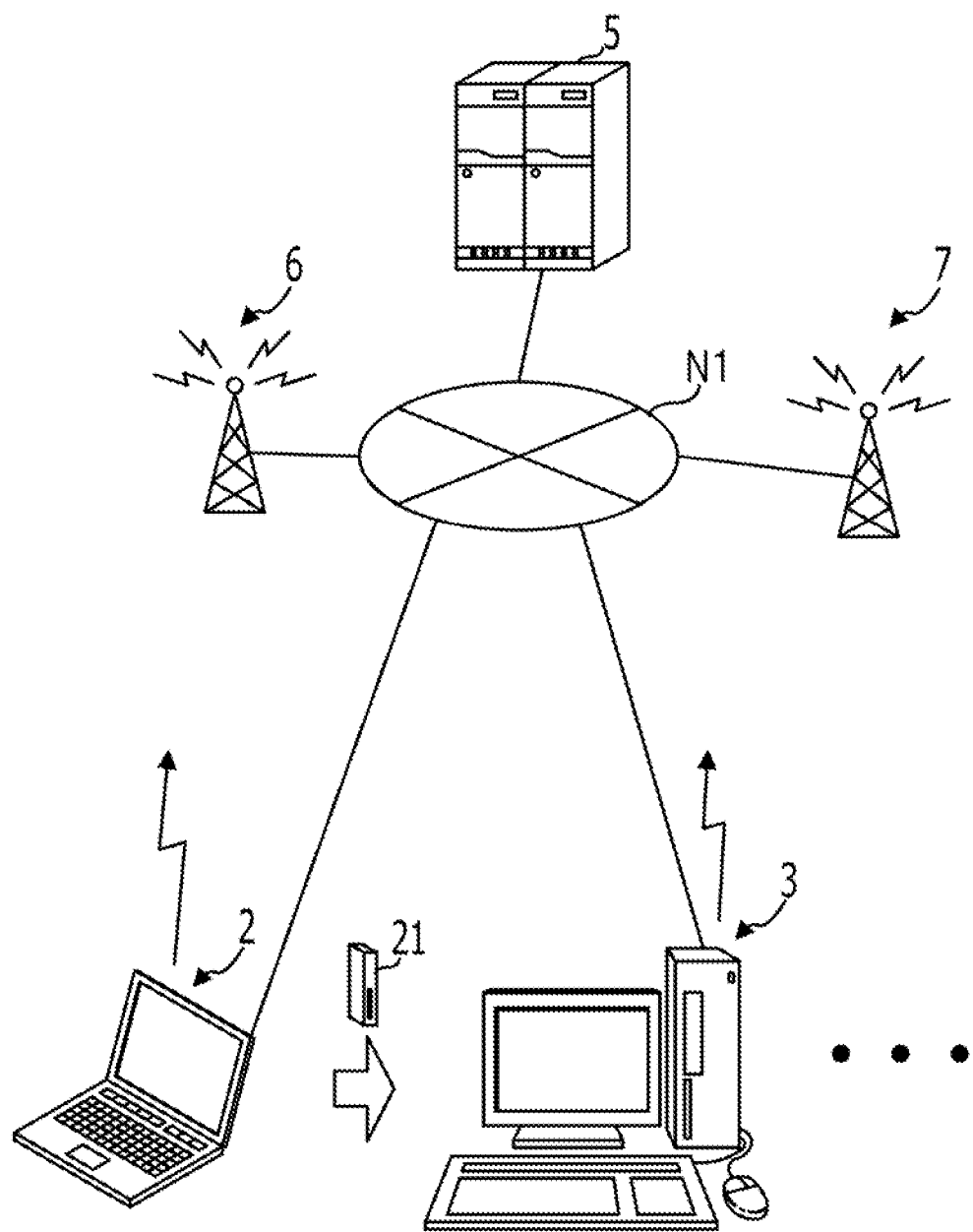
FIG. 1 illustrates an example of a data storage system.

Reference will now be made in detail to the embodiments, examples of which are illustrated in the accompanying drawings, wherein like reference numerals refer to the like elements throughout. The embodiments are described below to explain the present invention by referring to the figures. In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element between the two elements, or one or more intervening elements may also be present.

According to conventional technologies, a storage device may not notify an execution of a leakage prevention process to an external device, depending on the status of a communication apparatus or mechanism.

Hereinafter, an embodiment will be specifically described by referring to accompanying drawings. A data storage system according to the embodiment includes; a data processor to which a storage device is connected, and a server device that receives a notification informing that a leakage prevention processing has been applied to the storage device. The server device may operate as a processing and storage device. An example of a computer that corresponds to the data processor includes a desktop personal computer (PC), a laptop PC, a mobile phone, a Personal Digital Assistant (PDA), and a portable game device. The data processor is capable of connecting to a storage device. The data processors are classified into registered devices that are registered to a storage device and unregistered devices that are not registered to the storage device. An example of a device that corresponds to a storage device may include an HDD and a Universal Serial Bus (USB) memory. Among data processors, typically registered devices are permitted to read data from the storage device.

The registered device is an authorized data processor that is permitted to read data from the storage device, while the unregistered device is an unauthorized data processor that is not permitted to read data from the storage device. The data storage system monitors whether or not data stored in the storage device is read by and leaked to the unauthorized device when the server device receives a notification transmitted from each data processor. The first embodiment will be described, for example, when a data processor is a PC.

FIG. 1 illustrates an example of a data storage system. Reference numerals 2 and 3 in FIG. 1 indicate PCs respectively. The reference numeral 2 is a registered device that is registered beforehand. The reference numeral 3 indicates an unregistered device that is not registered beforehand. Hereinafter, the registered device 2 may sometimes be called a registered PC, while the unregistered device 3 may sometimes be called an unregistered PC. The data storage system may include one or a plurality of the registered PC2 or unregistered PC3. The registered PC2 includes a secure hard disk drive (HDD) 21 that is a storage device for storing or reading confidential data. The registered PC2 may be, for example, a laptop PC that is operated by an employee in a company and into which data for internal use only is stored, and may be taken out of the company.

The unregistered PC3 may be a desktop PC to which the secure HDD21 taken out of the registered PC2 in an unauthorized manner may be connected and used by an unauthorized third party who is not permitted to read such data. A server device 5 may be, for example, a server device installed in the company. The registered PC2 and the unregistered PC3 may include a plurality of communication units that correspond to a Wireless Wide Area Network (WWAN), a Local Area Network (LAN), and a Wireless Local Area Network (WLAN) for connecting to a network N1.

The WWAN is a network using a mobile phone communication network etc., and may be used by many people. The LAN is a network in which for example, devices in the same building are connected by twisted-pair wires, coaxial cables, and optical fibers etc., and data is transmitted and received in the LAN. The WLAN is a network using wireless communication among devices that comply with IEEE 802.11, etc. The effective communication range of the WLAN may be in stores or homes to which wireless communication relays are installed. A wireless communication station 6 that supports the WWAN and a wireless communication station 7 that supports the WLAN are connected to the network 1.

When the WWAN is selected as a transmission medium or mechanism, the registered PC2 and the unregistered PC3 access the network N1 by performing wireless communication with the wireless station 6 and connect to the server device 5. Likewise, when the WLAN is selected as a transmission means, the registered PC2 and the unregistered PC3 access the network N1 by performing wireless communication with the wireless station 7 and connect to the server device 5. The registered PC2 may not necessarily include all of the communication units that support WWAN, LAN, and WLAN and may include one or some of the communication units. The unregistered PC3 may not include the communication units.

Figure 2:
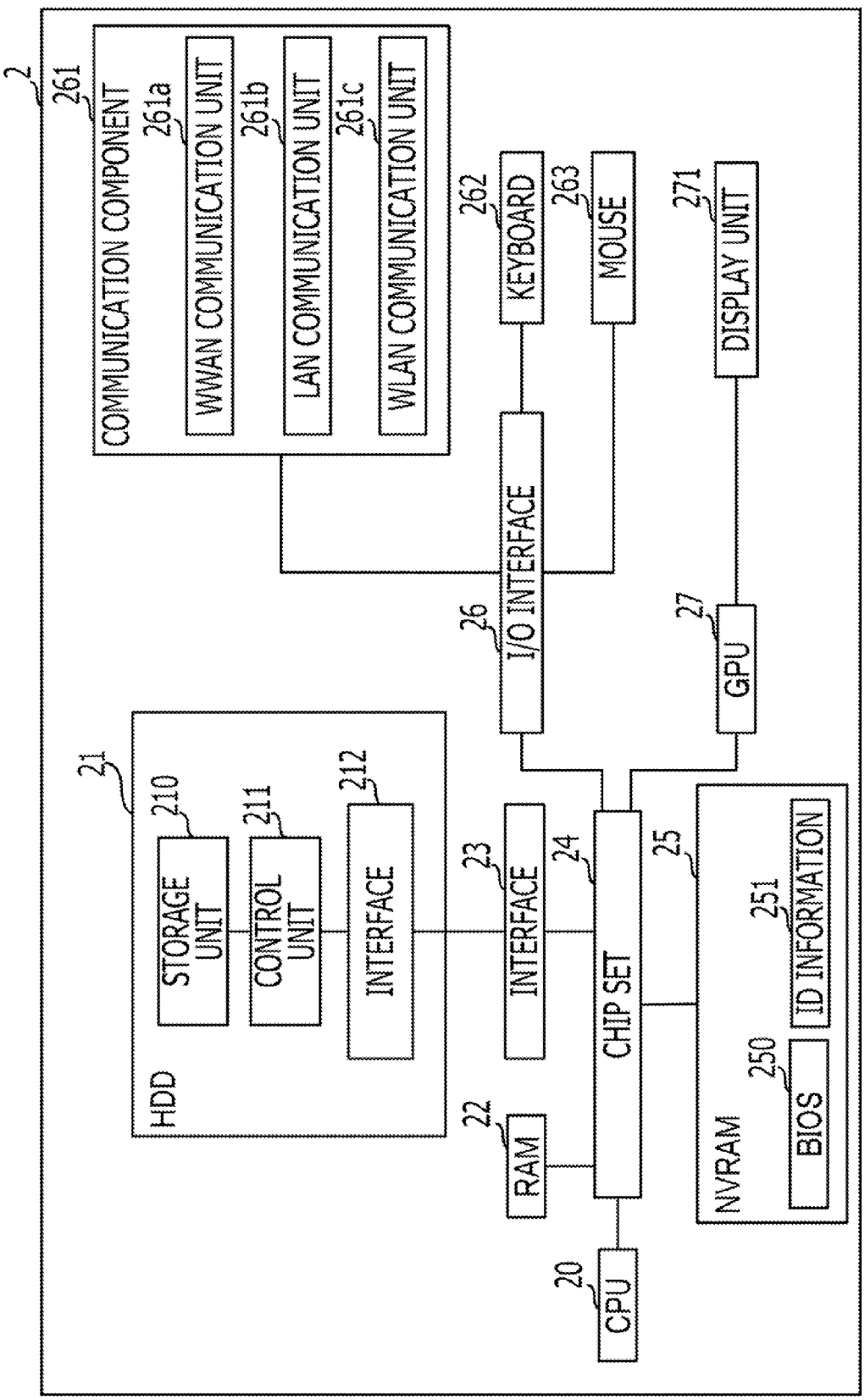
FIG. 2 is a block diagram illustrating hardware and functions of a registered personal computer (PC) according to a first embodiment.

FIG. 2 is a block diagram illustrating the hardware and functions of a registered personal computer 2 according to the first embodiment. The registered PC2 may include a Central Processing Unit (CPU) 20 as an arithmetic processing unit that performs a central function, a chip set 24 that controls transmission and reception of data to and from the CPU20, and a Random Access Memory (RAM) 22 that stores data and programs read from the secure HDD21. The chip set 24 connects the CPU20 and a bus line, and functions as various controllers etc.

The registered PC2 includes an interface 23 for transmitting and receiving data to and from the connected secure HDD21 and a Graphics Processing Unit (GPU) 27 that performs image processing. A plurality of HDDs that includes the secure HDD21 may be connected to the interface 23. A display unit 271 such as a liquid crystal display is connected to the GPU 27. The registered PC2 includes a Non-volatile Random Access Memory (NVRAM) 25, and an I/O interface 26. The I/O interface 26 connects a communication component 261 for connecting to the network N1 and a keyboard 262 and a mouse 263, by which a user performs input operation, to the CPU20 through a bus line.

The communication component 261 includes a WWAN communication unit 261a, a LAN communication unit 261b, and a WLAN communication unit 261c. The communication component 261 may not necessarily include all of the WWAN communication unit 261a, the LAN communication unit 261b, and the WLAN communication unit 261c, and may include one or some of the communication units. Hereinafter, the WWAN communication unit 261a, the LAN communication unit 261b, and the WLAN communication unit 261c are simply called, WWAN, LAN, and WLAN.

The NVRAM25 is a Static Random Access Memory (SRAM) to which power is supplied from a small battery and which retains stored information even while no power is supplied from an external source. The NVRAM25 stores a Basic Input Output System (BIOS) 250 that is software for performing input to and output from hardware, and an ID information 251 that is identification information unique to each of the registered PC2. The secure HDD21 stores data transmitted from the CPU20 through the chipset 24 and outputs stored data and programs to the RAM 22 through the chipset 24.

The secure HDD21 includes a storage unit 210 that stores data and programs, a control unit 211 that controls storing and reading data to and from the storage unit 210, and an interface 212 that receives and transmits data to and from the interface 23. The control unit 211 permits or prohibits access to a user area, which will be described later, of the storage unit 210. The interface 212 and the interface 23 comply with standards such as Integrated Drive Electronics (IDE), Advanced Technology Attachment (ATA), and USB standards. The interface 212 and the interface 23 may comply with standards such as Personal Computer Memory Card International Association (PCMCIA).

Figure 3:
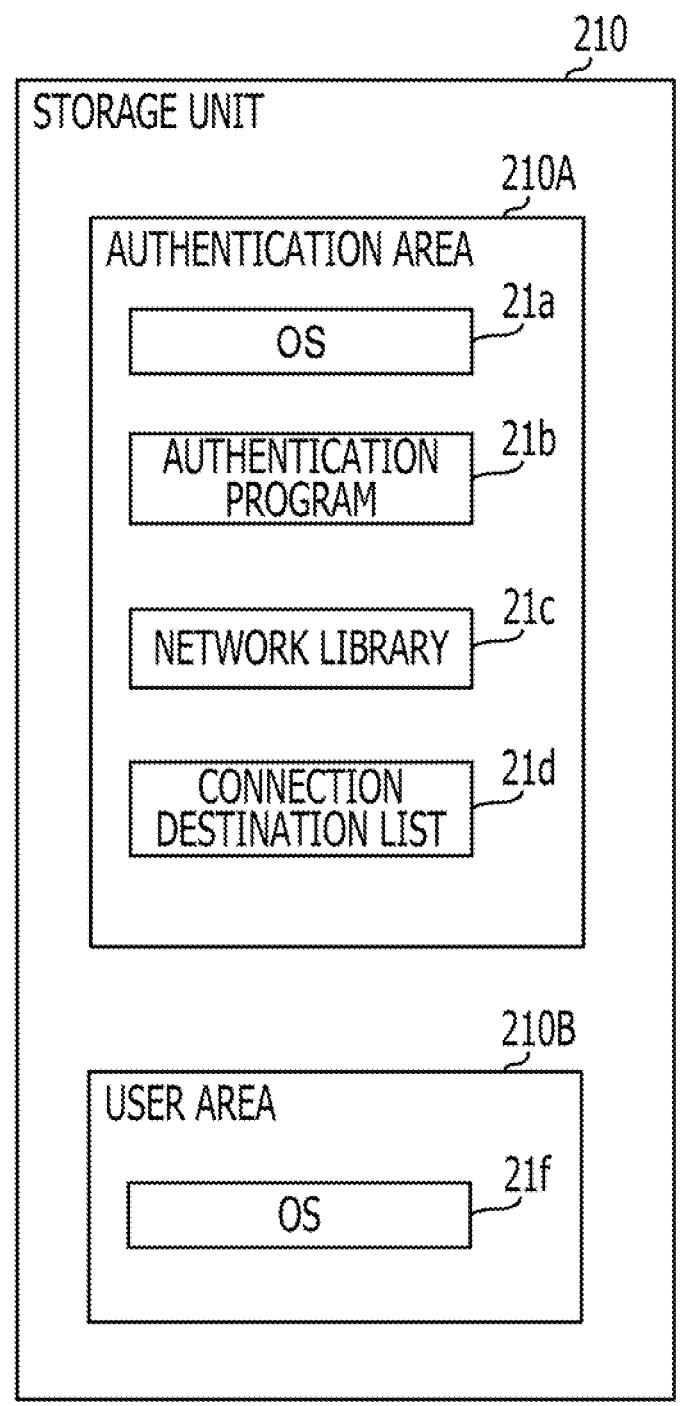
FIG. 3 is a diagram illustrating stored content of a storage unit of a secure hard disk drive (HDD)

FIG. 3 is a diagram illustrating the content of the storage unit 210 of the secure hard disk drive (HDD). The storage unit 210 includes an authentication area 210A to which access is typically permitted and a user area 210B to which access is permitted when the secure HDD21 is connected to the registered PC2. The authentication area A of the storage unit 210 stores an authentication program 21b for authenticating whether or not a connected PC is a registered PC, and an Operating System (OS) 21a for executing the authentication program 21b. The authentication area 210A of the storage unit 210 stores a network library 21c that includes various drivers for connecting to the network N1 by the communication component 261 when the authentication program 21b is running, and a connection destination list 21d.

As one example of an authentication area 210A of the storage unit 210, a Pre-Boot Authentication (PBA) area included in a HDD specification defined by Trusted Computing Group (TCG) in order to achieve security functions for computers may be considered. Moreover, the storage unit 210 stores a Master Boot Record (MBR), which is not illustrated. The MBR stores a program for calling a loader to start the OS21a. The user area 210B of the storage unit 210 stores an OS21f that is started when access is permitted. The user area 210B of the storage unit 210 becomes capable of storing and reading data through the chip set 24 and the interface 23 when access is permitted by the control unit 211.

FIG. 4 illustrates an example of a record layout of the connection destination list 21d. The connection destination list 21d is stored in the authentication area 210A of the storage unit 210 beforehand. The connection destination list 21d includes communication units of computers that include the registered PC2 or the unregistered PC3 and information of connection destinations when respective communication units are used. The example of FIG. 4 includes communication units for WWAN, LAN, and WLAN, and each of the communication units stores connection destinations when communication is established through or without a Virtual Private Network (VPN). The VPN is a network, for example, a company's LAN that is interconnected through an Internet network N1. The connection destination stores information that specifies places to which the server device 5 may be connected through the network N1.

Information indicated in the connection destination is, for example, addresses that specify a Web device or a file server on the Internet to which the server device 5 may connect, or an e-mail address through which the server device 5 may receive an data. The Web device on the Internet to which the server device 5 may connect may be, for example, a Web device that provides a blog service and stores execution results transmitted from the registered PC2 or the unregistered PC3 as needed. Information indicated in the connection destination is, for example, may be an address of the server device 5 to which the communication component 261 directly connect to. The connection destination list 21d in FIG. 4, for example, stores "www.yyy.com" and "www.xxx.com." The "www.yyy.com" is a connection destination connected through the VPN when the WWAN is selected, while the "www.yyy.com" is a connection destination that is connected without passing through the VPN when the WWAN is not selected.

Figure 5:
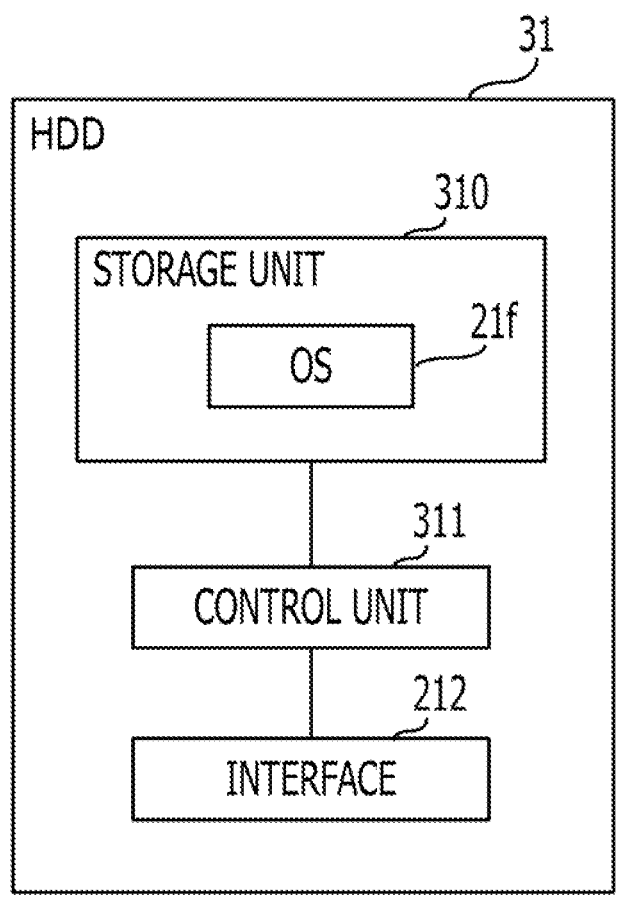
FIG. 5 is a block diagram illustrating functions of a conventional HDD.

FIG. 5 is a block diagram illustrating a conventional hard disk drive. The unregistered PC3 includes a conventional HDD 31 instead of the secure HDD21 of the registered PC2. Moreover, the unregistered PC3 may not be limited to that with the communication component 261, but may be that without the communication component 261. A leakage prevention process, which will be described later, is not applied to the conventional HDD 31, and there is no limitation to store and read data to and from the conventional HDD 31. The conventional HDD 31 includes a storage unit 310 for storing data and programs, a control unit for controlling storing and reading data to and from the storage unit 310, and an interface 212.

The storage unit 310 does not include the authentication area 210A and the user area 210B that are included in the storage unit 210 of the secure HDD21, and access to the storage unit 310 is typically permitted. The storage unit 310 stores the OS21f. The storage unit 310 stores a MBR, which is not illustrated, and the MBR stores a program for calling a loader to start the OS21f. When the unregistered PC3 is turned on, the OS21f is read from the storage unit 310 and is started to run various applications. The storage unit 310 stores various data provided to the conventional HDD31 from the CPU20 through the chip set 24, the interface 23, and the interface 212.

The CPU20 of the registered PC2 and the unregistered PC3 reads and executes the authentication program 21b when the secure HDD21 is connected. Whether or not the connection destination of the secure HDD21 is the registered PC2 is authenticated according to the authentication program 21b, and a leakage prevention process is executed to the secure HDD21 according to the authentication result. Likewise, the CPU20 functions as an acquisition unit for acquiring the status of one or the statuses of a plurality of communication units included in the communication component 261 according to the authentication program 21b, and functions as a selection unit for selecting one communication unit. The CPU20 also functions as a notification unit for notifying an execution of a leakage prevention process to the server device 5 according to the authentication program 21b, and as an informing unit for indicating a message that prompts to connect to the registered PC2 on the message display unit 271.

Figure 6:
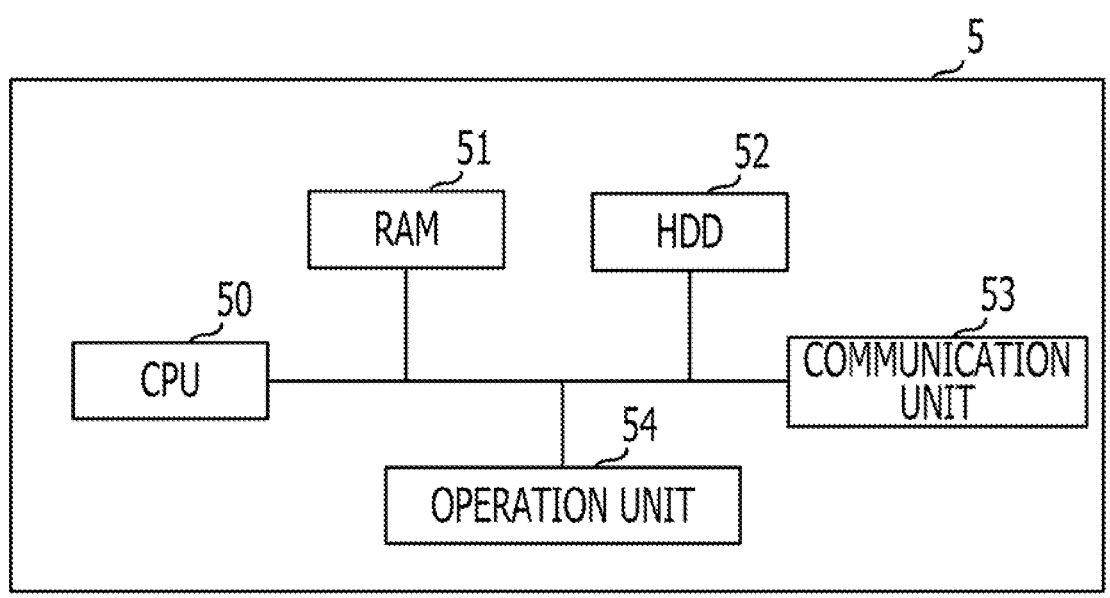
FIG. 6 is a block diagram illustrating hardware of a server device.

FIG. 6 is a block diagram illustrating hardware of the server device 5. The server device 5 includes a CPU 50 as an arithmetic processing unit that performs a central function, a HDD 52 (processing and storage device) that stores data and programs, and a Random Access Memory (RAM) 51 that stores programs read from the HDD 52. In the server device 5, a communication unit 53 that connects to the network N1, and an operation unit 54 that includes a keyboard and a mouse are connected to the CPU 50 through a bus line. The CPU 50 stores an execution result of a leakage prevention process that is received by the communication unit 53 from the registered PC2 or the unregistered PC3.

FIG. 7 is a flowchart illustrating a registration process performed by the registered PC2. The registration process is performed to store information regarding the registered PC2 in the secure HDD21 so that data may be read typically by the registered PC2. The CPU20 of the registered PC2 reads the ID information 251 from the NVRAM25 (Operation S11) and stores the ID information 251 in the authentication area of the storage 210 in the secure HDD21 (Operation S12). The CPU20 acquires the type of communication units included in the communication component 261 (Operation S13) and reads the connection destination list 21d from the authentication area of the storage unit 210 (Operation S14).

The CPU20 acquires the statuses of the acquired communication units to the respective communication destinations (Operation S15). In order to acquire the statuses, the status of whether the connection is effective or not may be acquired by trying to connect to a connection destination for each communication unit. The CPU20 stores the statuses of the respective communication units in the connection destination list 21d (Operation S16) and completes the registration process. Accordingly, the statuses of whether the connections to the destinations for a plurality of the communication units included in the communication component 261 of the registered PC2 are effective or not are stored together with the ID information of the registered PC2 in the authentication area 210A of the storage unit 210 in the secure HDD21.

Figure 8A:
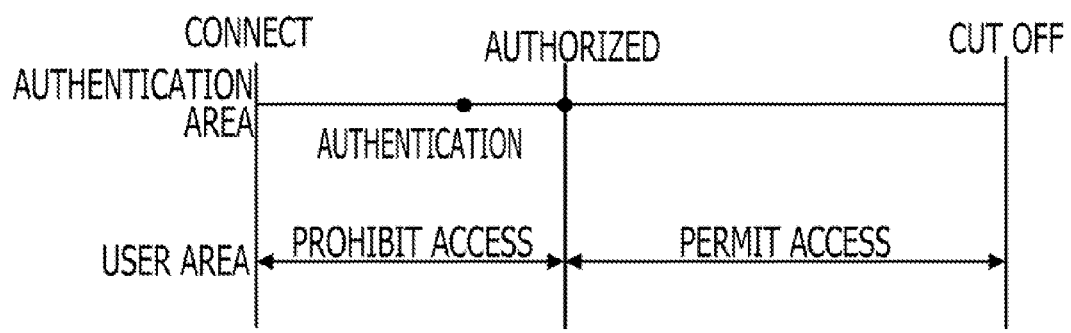
FIGS. 8A to 8C illustrate operation overviews when the secure HDD is connected to a registered PC or an unregistered PC.
Figure 8B:
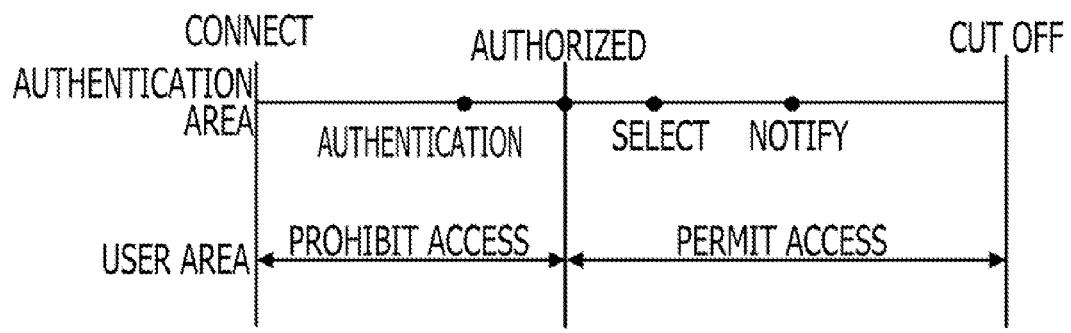
Figure 8C:
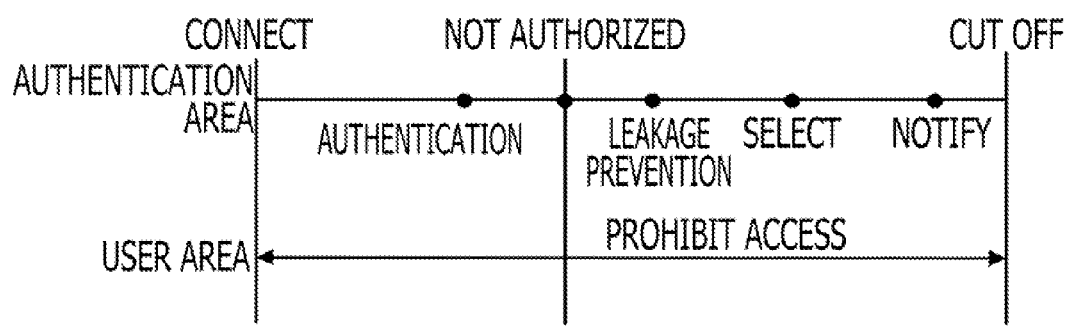

FIGS. 8A to 8C illustrate operation overviews when the secure HDD21, to which the registration process illustrated in FIG. 7 is applied, is connected to a registered PC2 or an unregistered PC3. In FIGS. 8A, 8B, and 8C, the horizontal axis indicates a time axis, and operations sequentially performed for the authentication area 210A and the user area 210B of the storage unit 210 in the secure HDD21 are illustrated. Moreover, in FIGS. 8A, 8B, and 8C, the secure HDD21 is not set as a start device and the HDD21 functions as a HDD added after starting the registered PC2 or the unregistered PC3.

FIG. 8A illustrates operations when the secure HDD21, to which no leakage prevention process is applied, is connected to the registered PC2. When the secure HDD21 is connected to the registered PC2 after starting the registered PC2, a drive for the secure HDD21 is displayed in the display unit 271 of the registered PC2. Access to the user area 210B of the secure HDD21 is prohibited by the control unit 211. The authentication program 21b stored in the authentication area 210A is displayed in the display unit 271 as data stored in the drive.

When a user selects the authentication program 21b displayed in the display unit 271 through the keyboard 262 or the mouse 263 and provides an instruction to execute, the authentication program 21b is read from the authentication area 210A. The CPU20 of the registered PC2 authenticates the registered PC2 that is a connection destination of the secure HDD21 by executing the authentication program 21b. As a result of the authentication, the registered PC2 is authenticated as the authorized registered PC2 and access to the user area 210B is permitted by the control unit 211 of the secure HDD21 until the secure HDD21 is cut off from the registered PC2. When the secure HDD21 is connected to the registered PC2 as described above, data stored in the user area may be read by the registered PC2.

FIG. 8B illustrates when a secure HDD21, to which a leakage prevention process is already applied, is connected to the registered PC2. When the leakage prevention process, which will be described later, is applied to the secure HDD21, the authentication area 210A of the storage unit 210 stores the execution result. The execution result includes information indicating that the leakage prevention process is executed, and the ID information 251 of an unregistered PC3 that is connected to the secure HDD21 when the leakage prevention process is executed. When the secure HDD21, to which the leakage prevention process is applied, is connected to the registered PC2 after starting the registered PC2, a drive for the secure HDD21 is displayed in the display unit 271 of the registered PC2 as in the case of the secure HDD21 to which no leakage process is applied.

Access to the user area 210B is prohibited by the control unit 211, and typically the authentication program 21b is displayed in the display unit 271. When a user instructs an execution of the authentication program 21b, the CPU20 of the registered PC2 authenticates the registered PC2 to which the secure HDD21 is connected and permits access to the user area 210B through the control unit 211 of the secure HDD21. According to the authentication program 21b, the CPU20 selects communication units that may be operated among the communication component 261 of the registered PC2 to which the secure HDD21 is connected. The CPU20 notifies an execution of the leakage prevention process to the server device 5 by transmitting the execution result stored in the authentication area 210A of the storage unit 210 by using the selected communication unit. The content of the notification to the server device 5 is, for example, the ID information 251 of the unregistered PC3 to which the secure HDD21 is connected when the leakage prevention process is executed.

FIG. 8C illustrates when the secure HDD21 is connected to the unregistered PC3. When the secure HDD21 is connected to the unregistered PC3 after starting the registered PC3, a drive for the secure HDD21 is displayed in the display unit 271 of the registered PC3. Access to the user area 210B is prohibited by the control unit 211 and typically the authentication program 21b is displayed in the display unit 271. When a user instructs an execution of the authentication program 21b, the CPU20 of the unregistered PC3 authenticates the unregistered PC3 as the unauthorized PC to which the secure HDD21 is connected and the control unit 211 continues to prohibit access to the user area 210B.

The CPU20 executes a leakage prevention process to the secure HDD21 according to the authentication program 21b. The leakage prevention process is, for example, a process to erase data stored in the user area 210B of the storage unit 210 in the secure HDD21 to prevent the data stored in the user area 210B from being read by the unregistered PC3. Moreover, the leakage prevention process may be a process in which the control unit 211 prohibits all access to the storage unit 210.

The CPU20 of the unregistered PC3 to which the secure HDD21 is connected selects an effective communication unit among those of communication component 261 of the unregistered PC3 to which the secure HDD21 is connected. When the CPU20 of the unregistered PC3 selects an effective communication unit among one or a plurality of communication units included in the communication component 261 of the unregistered PC3, the CPU20 notifies an execution of the leakage prevention process to the server device 5 by transmitting the execution result by using the selected communication unit. When the CPU20 of the unregistered PC3 to which the secure HDD21 is connected selects a communication unit included in the communication component 261 of the registered PC2, the CPU20 displays a message prompting the user who is operating the unregistered PC3 to connect to the registered PC2 in the display unit 271 of the unregistered PC3 to which the secure HDD21 is connected.

Figure 9:
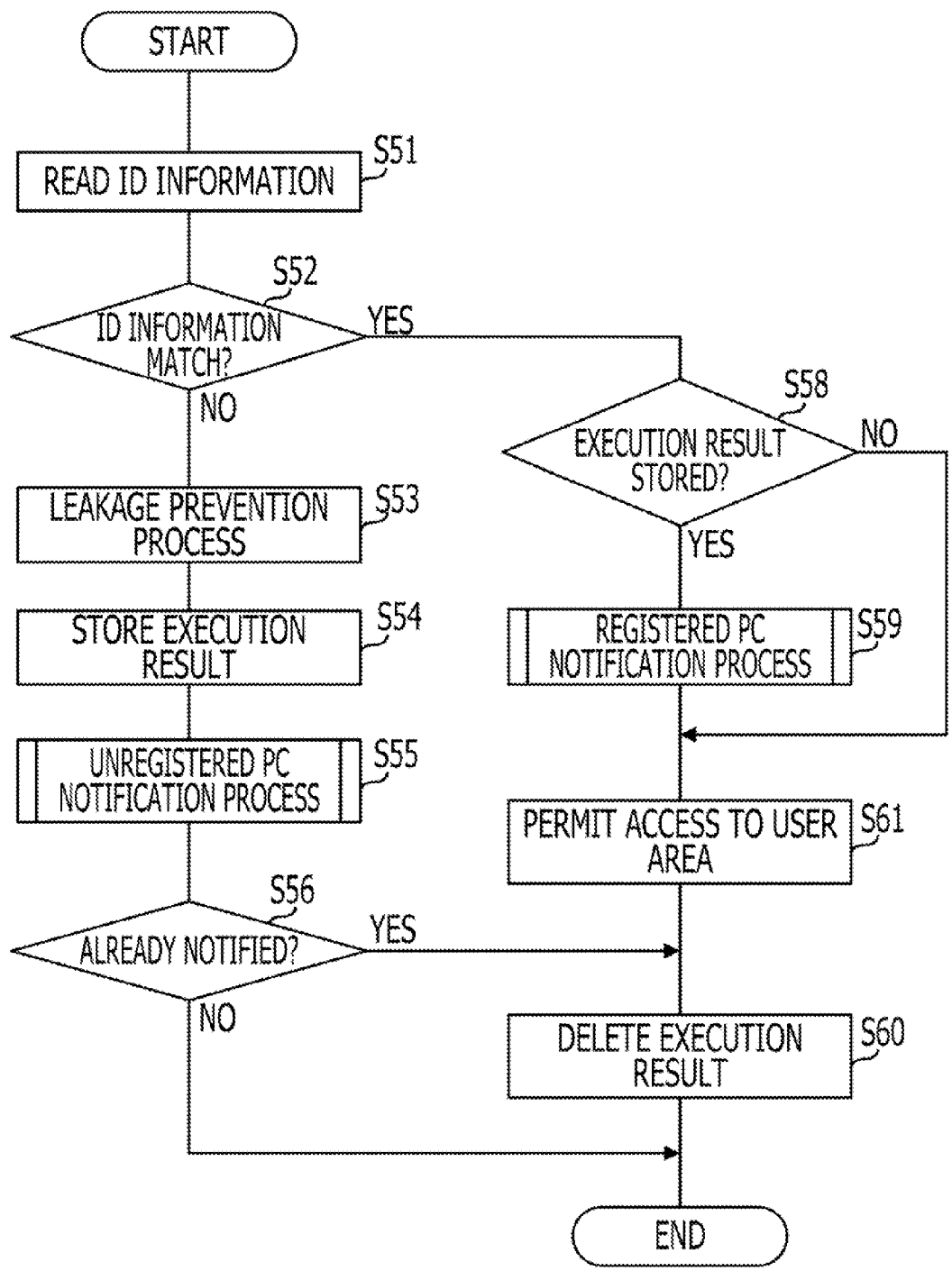
FIG. 9 is a flowchart illustrating a process of an authentication program according to the first embodiment.

FIG. 9 is a flowchart illustrating a process of the authentication program 21b according to the first embodiment executed by the CPU20. The authentication program 21b is executed by the CPU20 of a computer to which the secure HDD21 is connected. The computer to which the secure HDD21 is connected may be a registered PC or an unregistered PC3. The CPU20 reads the ID information 251 stored in the NVRAM25 and the ID information stored in the authentication area 210A of the storage unit 210 in the secure HDD21 (Operation S51). The CPU20 determines whether or not the two pieces of read ID information match or not (Operation S52). When the CPU20 determines the two pieces of information do not match (No at Operation S52), the CPU20 executes a leakage prevention process to the secure HDD21 so as to prevent data from being read by the unregistered PC3 (Operation S53). When the CPU20 determines the two pieces of information do not match, this indicates that the computer to which the CPU20 is included is an unregistered PC3.

The leakage prevention process executed at Operation S53 may be erasing data in the user area 210B as described above, or may be prohibiting all access to the storage 210.

The CPU20 stores the execution result of the leakage prevention process in the authentication area 210B of the storage unit 210 in the secure HDD21 (Operation S54). The execution result to be stored includes, for example, information on whether erasing data in the user area 210B succeeds or not, information indicating the time and date when the leakage prevention process is executed, and the ID information 251 read from the NVRAM25 at the Operation S51. The CPU20 executes an unregistered PC notification process, which will be described later, to notify an execution of the leakage prevention process to the server device 5, which will be described later (Operation S55). The CPU20 determines whether a notification is already transmitted or not by the unregistered PC notification process (Operation S56). When the CPU20 determines a notification is not transmitted yet (No in Operation S56), the CPU20 completes the process.

When the CPU20 determines the notification is already transmitted (Yes at Operation S56), the CPU20 deletes the execution result stored in the authentication area 210A of the storage unit 210 in the secure HDD21 (Operation S60), and completes the process. The CPU20 determines whether or not the execution result is stored in the authentication area of the storage unit 210 in the secure HDD21 (Operation S58) when the CPU20 determines the two pieces of information match (Yes at Operation S52). When the CPU20 determines the two pieces of information match at Operation S52, this indicates that the computer to which the CPU20 is included is the registered PC2. The CPU20 executes a registered PC notification process, which will be described later, to notify an execution of a leakage prevention process to the server device 5 from the registered PC2 (Operation S59), when the CPU20 determines that the execution result is stored (Yes at Operation S58).

The CPU20 permits access to the user area 210B through the control unit 211 of the secure HDD21 (Operation S61). Moreover, the CPU20 proceeds to the Operation S61 when the CPU20 determines that the execution result is not stored (No at Operation S58). The CPU20 deletes the execution result from the authentication area of the secure HDD21 (Operation S60), and completes the process.

Figure 10:
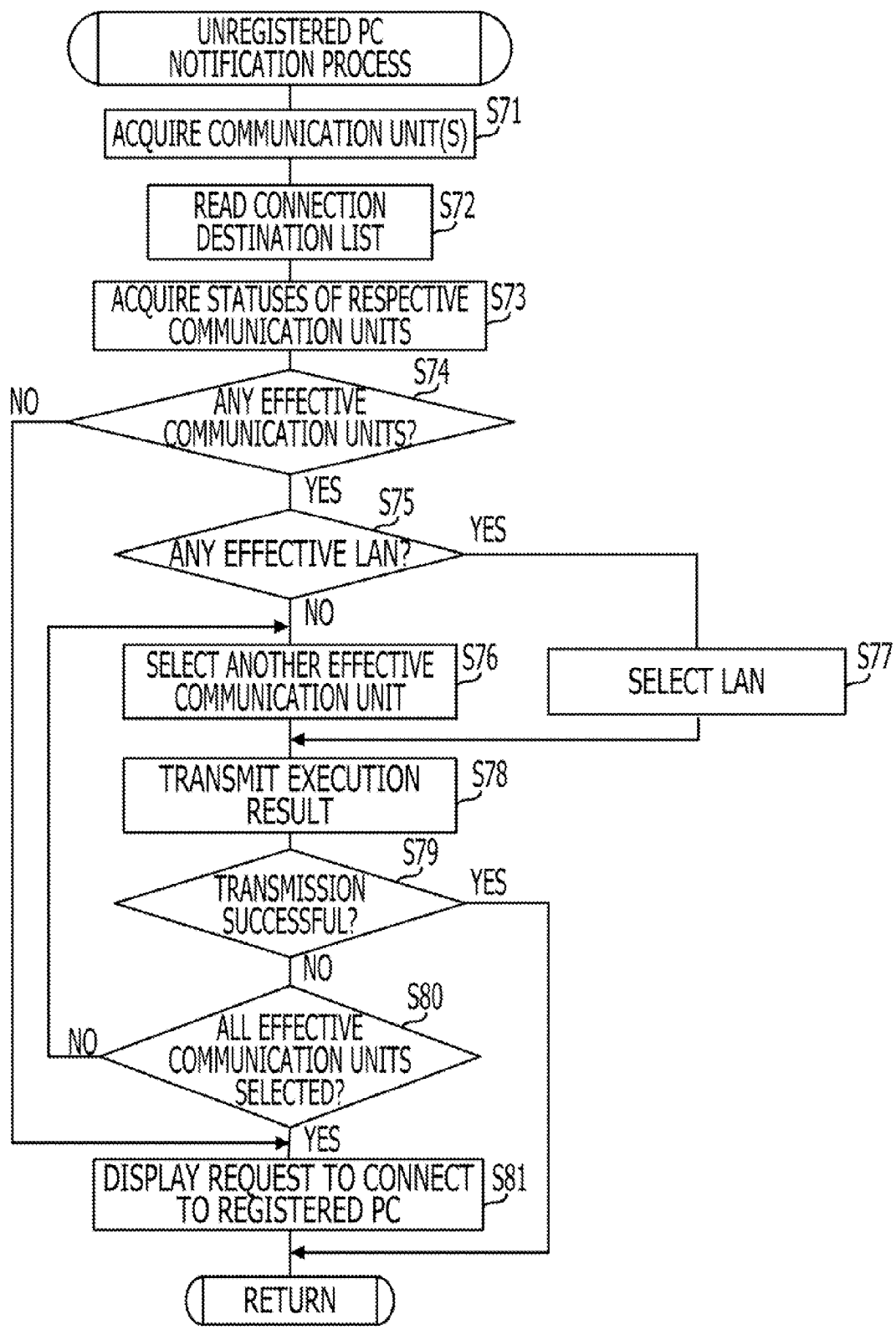
FIG. 10 is a flowchart illustrating an unregistered PC notification process according to the first embodiment.

FIG. 10 is a flowchart illustrating the unregistered PC notification process according to the first embodiment executed by the CPU20. The unregistered PC notification process is executed by the CPU20 at Operation S55 in FIG. 9. Hence, the CPU20 that executes the unregistered PC notification process is the CPU20 included in the unregistered PC3. The CPU20 acquires information regarding one or a plurality of communication units included in the communication component 261 (Operation S71). The connection destination list 21d is read from the authentication area 210A of the storage area 210 in the secure HDD21 (Operation S72). The CPU20 acquires the status of one or a plurality of the communication units acquired at Operation S71 by trying to connect to the connection destinations stored in the connection destination list 21d (Operation S73). The CPU20 determines whether any operable communication unit exists in one or a plurality of the communication units acquired at Operation S71 (Operation S74).

When the CPU20 determines that any operable, effective communication unit exists (Yes at Operation S74), the CPU20 determines whether or not any effective LAN exists among those effective communication units (Operation S75). When the CPU20 determines that an effective LAN exists (Yes at Operation S75), the CPU20 selects the LAN as a communication unit to use for transmitting a notification to the server device 5 (Operation S77). When the CPU20 determines there is no effective LAN (No at Operation S75), the CPU20 selects another effective communication unit to use for transmitting a notification to the server device 5 (Operation S76).

The CPU20 transmits the execution result using the selected communication unit (Operation S78). The CPU20 determines whether the transmission succeeds or not (Operation S79). When the CPU20 determines that the transmission fails (No at Operation S79), the CPU20 determines whether or not all of the effective communication units are already selected (Operation S80). When the CPU20 determines that not all of the effective communication units are selected in the connection destination list 21d (No at Operation S80), the CPU20 returns to the Operation S76 for selecting another effective communication unit.

When the CPU20 determines that all of the effective communication units are selected (Yes at Operation S80), the CPU20 displays a request to connect to the registered PC2 in the display unit 271 (Operation S81), and completes the process. When the CPU20 determines that all of the effective communication units are selected at the Operation S80, this indicates that there is no effective communication unit in the unregistered PC3 to which the CPU20 is included. Thus, the CPU20 outputs a request to connect the secure HDD to another computer which is different from the computer to which the CPU20 is included, in other words, another computer that may have an effective communication unit.

The connection request, for example, "Connect hard disk to registered PC." may be displayed. When the CPU20 determines that the transmission succeeds at the Operation S79 (Yes at Operation S79), the CPU20 completes the process. When the CPU20 determines that there is no effective communication unit at the Operation S74 (No at the Operation S74), the CPU20 proceeds to the Operation S81 that displays a connection request in the display unit 271. The reason why the effectiveness of the LAN is determined prior to other communication units at Operation S75 is that the transmission and reception of data through a LAN, which is a wired communication, are less likely to fluctuate. Thus using LAN instead of WWAN or WLAN may reduce the possibility of a failure in transmitting a notification to the server 5 due to an unstable communication status.

Figure 11:
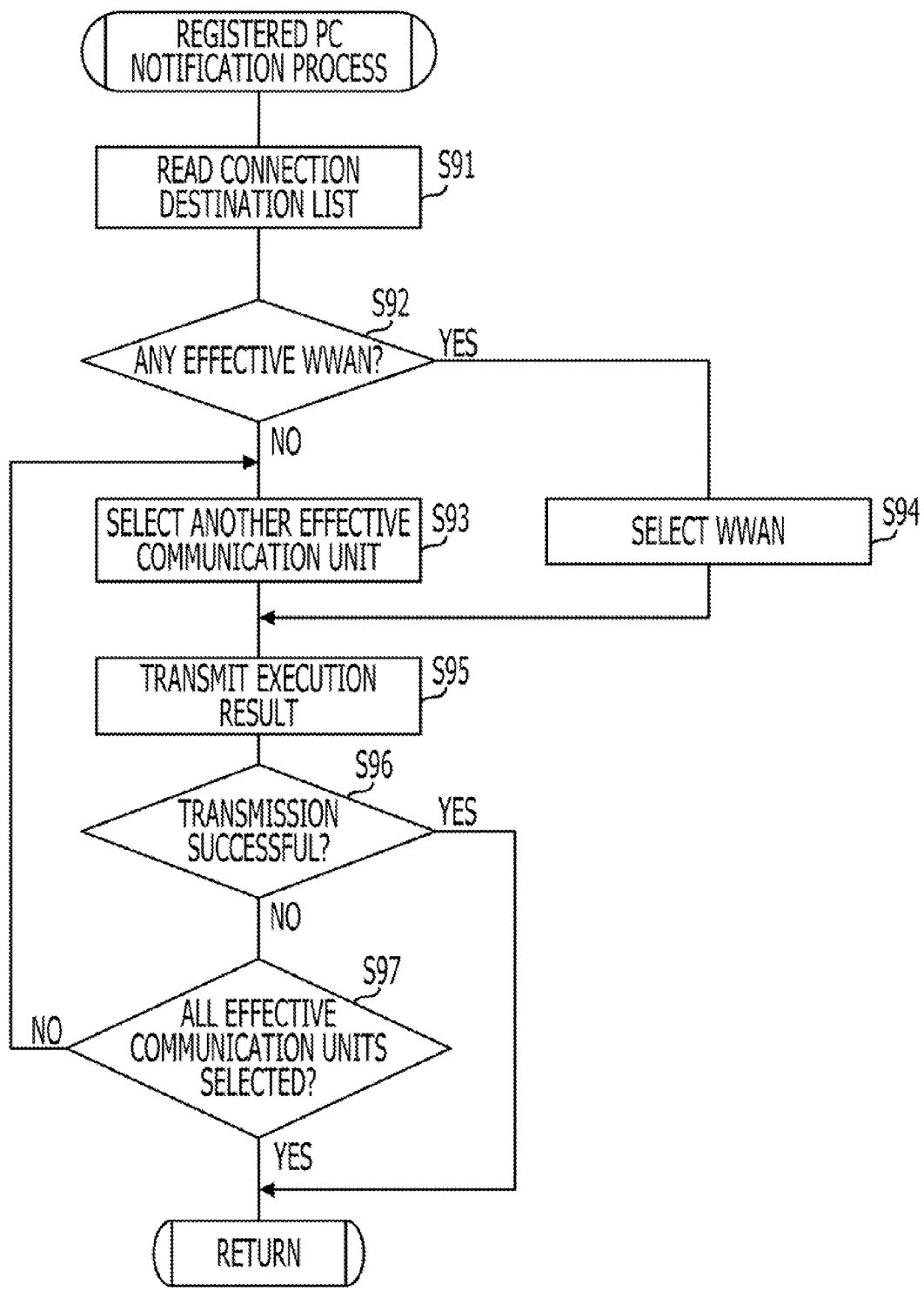
FIG. 11 is a flowchart illustrating a registered PC notification process.

FIG. 11 is a flowchart illustrating the registered PC notification process executed by the CPU20. The registered PC notification process is executed by the CPU20 at Operation S59 in FIG. 9. Therefore, the CPU20 that executes the registered PC notification process is the CPU20 included in the registered PC2. Prior to the process, as in the Operation S71 in FIG. 10, the CPU20 may acquire one or a plurality of communication units included in the communication component 261. The CPU20 reads the connection destination list 21d stored in the authentication area 210A of the storage unit 210 in the secure HDD21 (Operation S91). The CPU20 determines whether or not any effective WWAN exists by trying to connect to communication destinations that correspond to the WWAN information stored in the connection destination list 21*d* (Operation S92). When the CPU20 determines there is an effective WWAN (Yes at Operation S92), the CPU20 selects the WWAN as a communication unit to use for transmitting a notification to the server device 5 (Operation S94). When the CPU20 determines there is no effective WWAN (No at Operation S92), the CPU20 selects another effective communication unit to use for transmitting a notification to the server device 5 (Operation S93). The CPU20 transmits the execution result to the server device 5 using the selected communication result (Operation S95).

The CPU20 determines whether or not the transmission succeeds (Operation S96). When the CPU20 determines that the transmission fails (No at Operation S96), the CPU20 determines whether or not all of the effective communication units are already selected from the connection destination list 21*d* (Operation S97). When the CPU20 determines that not all of the effective communication units are selected in the connection destination list 21*d* (No at Operation S97), the CPU20 proceeds to the Operation S93 for selecting another effective communication unit. When the CPU20 determines that all of the effective communication units are already selected (Yes at Operation S97), the CPU20 completes the process. When the CPU20 determines that the transmission succeeds at Operation S96 (Yes at Operation S96), the CPU20 completes the process. The reason why the effectiveness of the WWAN is determined prior to other communication units at Operation S96 is that selecting the WWAN that provides wide communication coverage may reduce the possibility of a failure in transmitting a notification to the server 5.

Figure 12A:
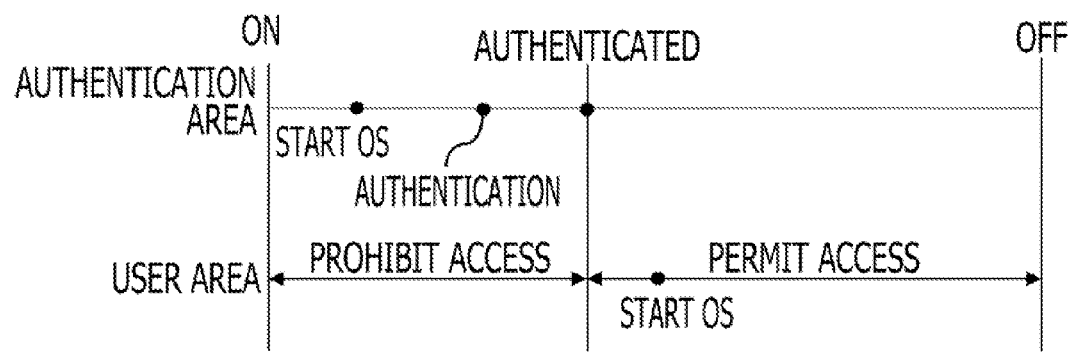
FIGS. 12A to 12C illustrate operation overviews when the secure HDD is connected to the registered PC or unregistered PC, and the secure HDD21 is set as a start device
Figure 12B:
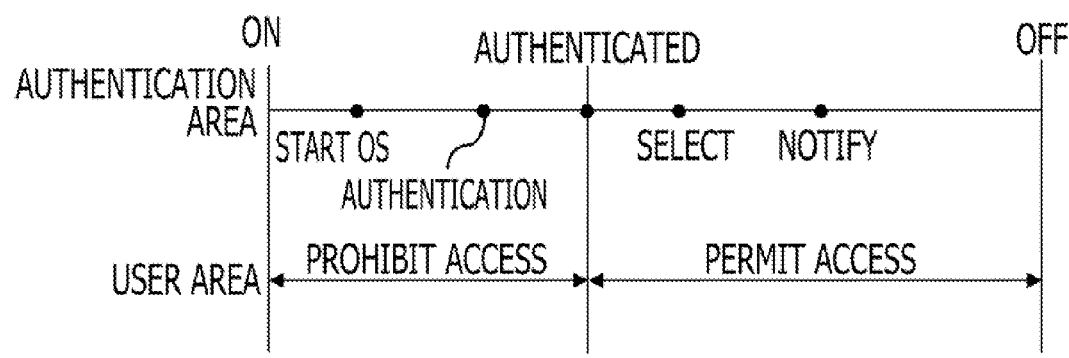
Figure 12C:
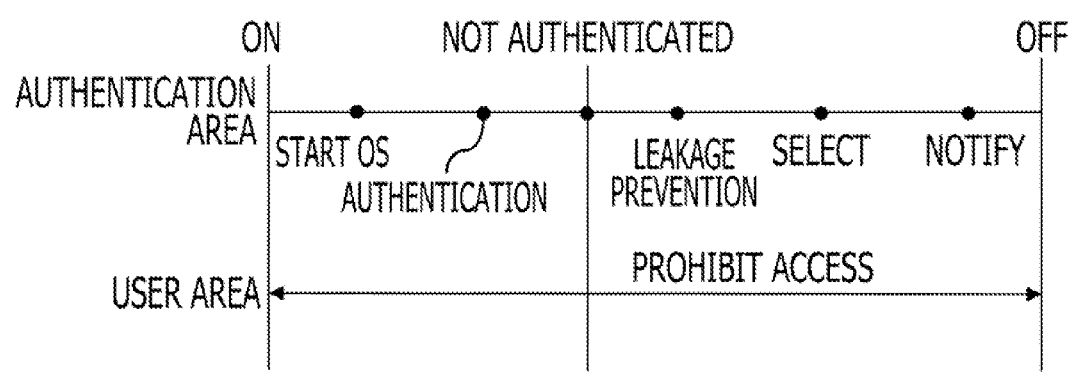

FIGS. 12A to 12C illustrate operation overviews when the secure HDD is connected to the registered PC or unregistered PC, and the secure HDD21 is set as a start device. In FIGS. 12A to 12C, the horizontal axis indicates a time axis, and operations sequentially performed for the authentication area 210A and the user area 210B of the storage unit 210 in the secure HDD21 are illustrated. In FIGS. 8A, 8B, and 8C, the secure HDD21 is not set as a start device, whereas in FIGS. 12A, 12B, and 12C, a case in which a secure HDD21 connected to the registered PC2 or the unregistered PC3 is set as a start device.

FIG. 12A illustrates an operation when the registered PC2 is turned on after a secure HDD21, to which no leakage prevention process is applied, is connected to the registered PC2. Access to the user area 210B of the storage unit 210 in the secure HDD21 is prohibited by the control unit 211. When the registered PC2 is turned on, the OS21*a* stored in the authentication area 210A of the storage unit 210 is read and started. The authentication program 21*b* that runs on the started OS21*a* is read. The CPU20 of the registered PC2 authenticates the registered PC2 to which the secure HDD21 is connected by running the authentication program 21*b*. As a result of the authentication, the registered PC2 is authenticated as the authorized registered PC2, and the control unit 211 of the secure HDD21 permits access to the user area 210B until the registered PC2 is turned off. Accordingly, when the secure HDD21 is connected to the registered PC2, data stored in the user area 210B may be read.

FIG. 12B illustrates an operation when the registered PC2 is turned on after a secure HDD21, to which a leakage prevention process is applied, is connected to the registered PC2. When the secure HDD21 to which the leakage prevention process is applied is connected to the registered PC2, as in the case of the secure HDD21 to which no leakage prevention process is applied is connected to the registered PC2, access to the user area 210B is prohibited by the control unit 211. The CPU20 starts the OS21*a* stored in the authentication area 210A and executes the authentication program 21*b*. According to the authentication program 21*b*, the CPU20 authenticates the registered PC2 to which the secure HDD21 is connected as the authorized registered PC2, and access to the user area 210B is permitted by the control unit 211 of the secure HDD21. The CPU20 selects an effective communication unit among those of communication component 261 of the registered PC2 to which the secure HDD21 is connected according to the authentication program 21*b*. The CPU20 notifies the execution of the leakage prevention process to the server device 5 by transmitting the execution result stored in the authentication area 210A of the storage unit 210 using the selected communication unit.

FIG. 12C illustrates an operation when the unregistered PC3 is turned on after a secure HDD21 is connected to the unregistered PC3. When the secure HDD21 is connected to the unregistered PC3, as in the case of when the secure HDD21 is connected to the registered PC2, the control unit 211 prohibits access to the user area 210B. The CPU20 starts the OS21*a* stored in the authentication area 210A and executes the authentication program 21*b*. According to the authentication program 21*b*, the CPU20 recognizes the unregistered PC3 connected to the secure HDD21 as an unauthorized registered PC3, and the control unit 211 continues to prohibit access to the user area 210B. Moreover, the CPU20 executes the leakage prevention process to the secure HDD21 according to the authentication program 21*b*.

According to the authentication program 21*b*, the CPU20 selects a communication unit from the communication component 261 of the registered PC2, or the communication component 261 of the unregistered PC3 to which the secure HDD21 is connected. When a communication unit is selected from the communication component 261 of the unregistered PC3 to which the secure HDD21 is connected, an execution of the leakage prevention process is notified to the server device 5 by transmitting the execution result to the server device 5 using the selected communication unit. When a communication unit in the communication component 261 of the registered PC2 is selected, the CPU20 displays a message prompting to connect to the registered PC2 in the display unit 271 of the unregistered PC3.

Figure 13:
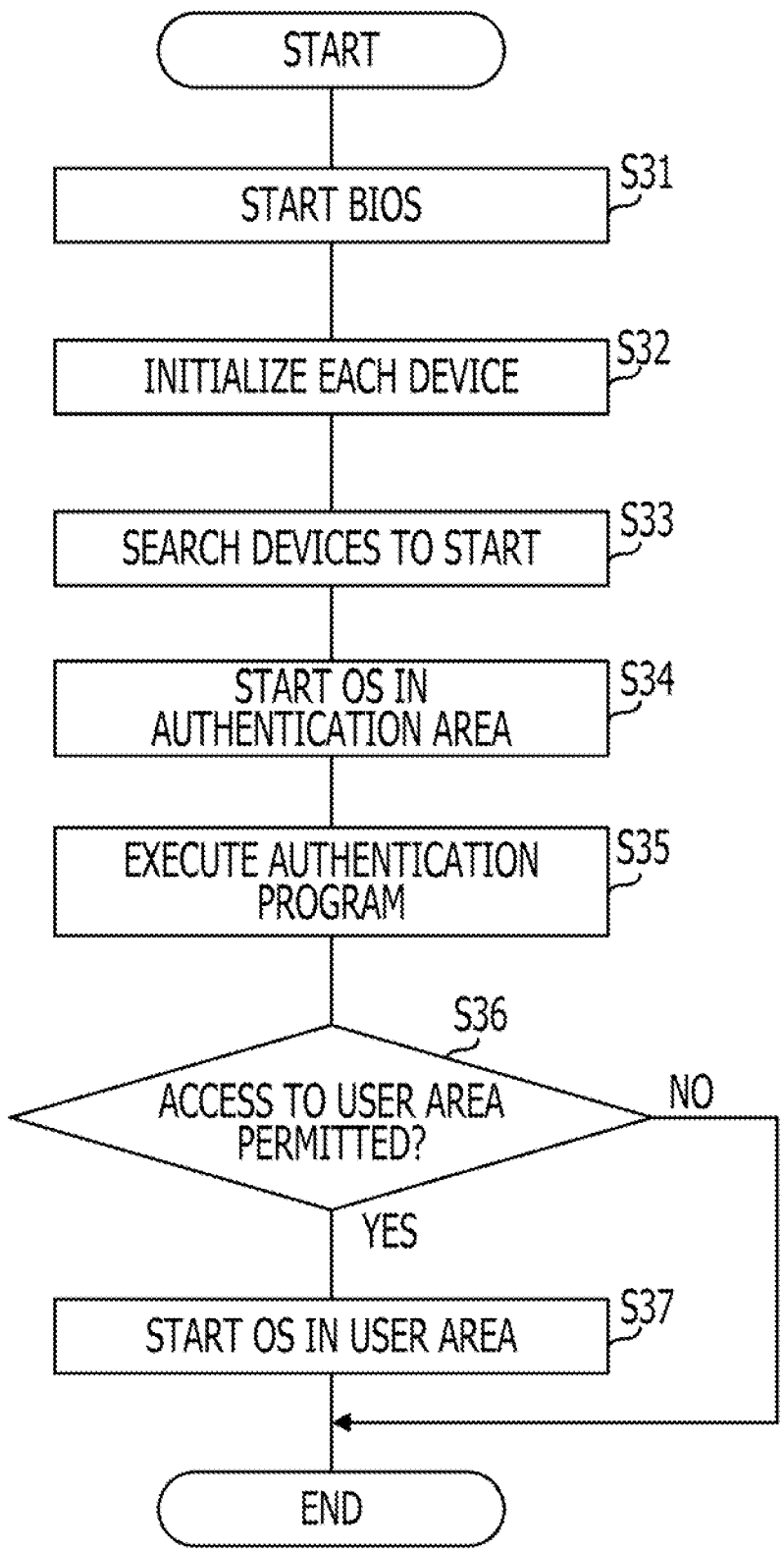
FIG. 13 is a flowchart illustrating a start process.

FIG. 13 is a flowchart illustrating a start process executed by the CPU20. The start process is executed by the CPU20 when a computer connected to the secure HDD21 is turned on. The computer to which the secure HDD21 is connected may be a registered PC2 or an unregistered PC3. The CPU20 reads and starts BIOS250 from the NVRAM25 (Operation S31). The CPU20 initializes each device by the started BIOS250 (Operation S32). The CPU20 searches for devices to start by BIOS250 (Operation S33), and starts the OS21*a* stored in the authentication area 210A of the storage area 210 in the secure HDD21 that is a start device (Operation S34). The CPU20 executes the authentication program 21*b* stored in the authentication area 210A (Operation S35).

The process executed by the authentication program 21*b* is substantially the same as the flowchart illustrated in FIG. 9 and, therefore will not be described here. The CPU20 determines whether or not access to the user area 210B is permitted by executing the authentication program 21*b* (Operation S36). When the CPU20 determines that the access is already permitted (Yes at Operation S36), the CPU20 starts the OS21*f* stored in the user area 210B (Operation S37), and completes the start process. When the CPU20 determines that the access is not permitted (No at Operation S36), the CPU20 completes the start process.

According to the first embodiment, a case is described in which a secure HDD21 is connected to an unregistered PC3, a communication unit in the unregistered PC3 is preferentially selected, and a notification is transmitted to the server device 5. However, the first embodiment is not limited to the above described case. For example, a WWAN provided by the registered PC2 is preferentially selected and a message indicating the secure HDD21 is connected to the registered PC2 may be displayed. In this case, a WWAN prioritized notification process, which will be described later, may be executed instead of the unregistered PC notification process executed at Operation S55 by the authentication program 21b in FIG. 9.

Figure 14:
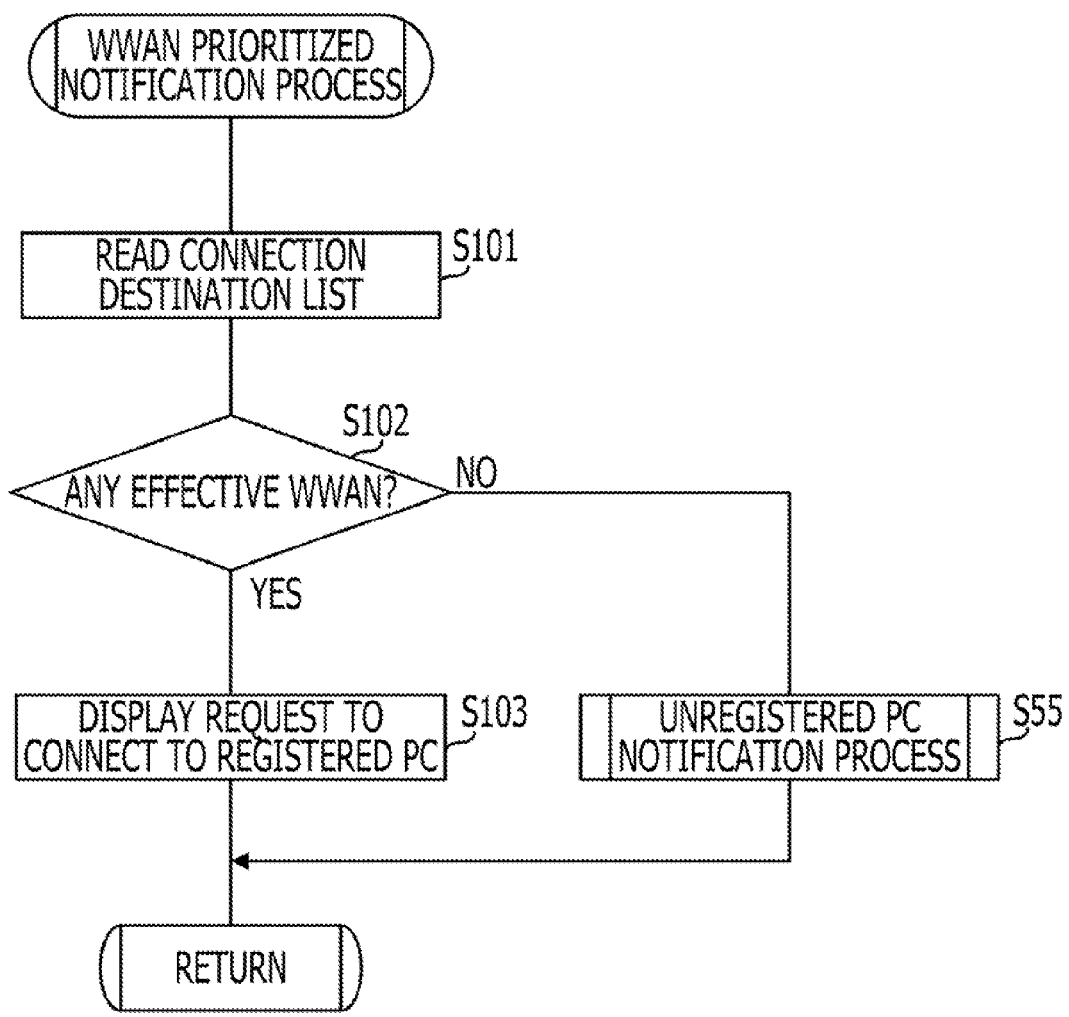
FIG. 14 is a flowchart illustrating a Wireless Wide Area Network (WWAN) prioritized notification process.

FIG. 14 is a flowchart illustrating a WWAN prioritized notification process. The CPU20 reads the connection destination list 21d stored in the authentication area 210A (Operation S101) and determines whether or not any effective WWAN exists by trying to connect to a communication destination that corresponds to WWAN information stored in the connection destination list 21d (Operation S102). When the CPU20 determines there is an effective WWAN (Yes at Operation S102), the CPU20 displays a request to connect to the registered PC2 (Operation S103), and completes the WWAN prioritized notification process. When the CPU20 determines there is no effective WWAN (No at Operation S102), the CPU20 executes the unregistered PC notification process illustrated in FIG. 10 (Operation S55) and completes the WWAN prioritized notification process. When the registered PC2 includes an effective WWAN, selecting the WWAN that may be used by many users and prompting to connect to the registered PC2 enables to reduce the possibility of a failure in transmitting a notification to the server 5.

At Operation S60 in FIG. 9, when an execution result of a leakage prevention process is transmitted to the server device 5, the execution result is deleted from the authentication area 210A of the storage unit 210 in the secure HDD21. However, the embodiment is not limited to this. For example, when an unregistered PC3 transmits an execution result to the server device 5, the execution result may not be deleted from the authentication area 210A. In this case, the execution result of the leakage prevention process is transmitted from both the unregistered PC3 and the registered PC2 to the server device 5. Thus, even when the result is not transmitted from either one of the computers due to a bad transmission status, the possibility of failure in transmitting the notification to the server 5 may be reduced.

According to the embodiment, when a leakage prevention process is executed to the secure HDD21, an effective communication unit is selected based on the statuses of communication units included in the registered PC2 or the unregistered PC3. The execution result of the leakage prevention process is notified to the server device 5 using the selected effective communication unit. Accordingly, a possibility of failure in transmitting the notification to the server device 5 may be reduced. The execution result notified from the registered PC2 or the unregistered PC3 to the server device 5 includes, for example, an Internet Protocol (IP) address assigned to the communication component 261, and Media Access Control (MAC) address of a network device that corresponds to each communication unit.

Moreover, the execution result may include, for example, an identification ID included in the OS21f that is started in the unregistered PC3. Accordingly, an unregistered PC3 that is connected to the secure HDD21 when a leakage prevention process is executed may be identified. The execution result notified to the server device 5 may include license information of the OS21f, or an application that is started in the unregistered PC3. As a result, a user of the unregistered PC3 to which the secure HDD21 is connected when the leakage prevention process is executed may be identified.

According to the first embodiment, a built-in hard disk is described as an example of a storage device. However, the embodiment is not limited to this and an external hard disk or a USB memory may be used. Moreover, the embodiment is not limited to the OS21a that is stored in the authentication area 210A, and the OS21f is stored in the user area 210B and functions as the start device. For example, typically the authentication program 21b is stored in the authentication area 210A and functions typically as a storage device. The registered PC and the unregistered PC3 are not limited to those that include WWAN, WLAN, and LAN as communication units, but may include a near field communication (NFC) and Body Area Network (BAN). The NFC complies with standards for Bluetooth® that carries out near field communication using a wireless signal of, for example, a 2.4 GHz band. The BAN is short-distance wireless communication near the human body that utilizes weak current flows present in a human body, and an electric field generated at the surface of the human body. In this case, a notification is transmitted to the server device 5 by connecting to the registered PC2 or the unregistered PC3 through the short-distance wireless communication or the BAN and by using a communication unit included in the registered PC2 and the unregistered PC3.

A case is described in which the unregistered PC3 stores the ID information 251 in the NVRAM25, however, the ID information 251 may not be stored. In this case, when the ID information 251 is not stored in the NVRAM25 of the unregistered PC3 to which the secure HDD21 is connected, the authentication program 21b may recognize the unregistered PC3 as the unauthorized unregistered PC3.

Figure 15:
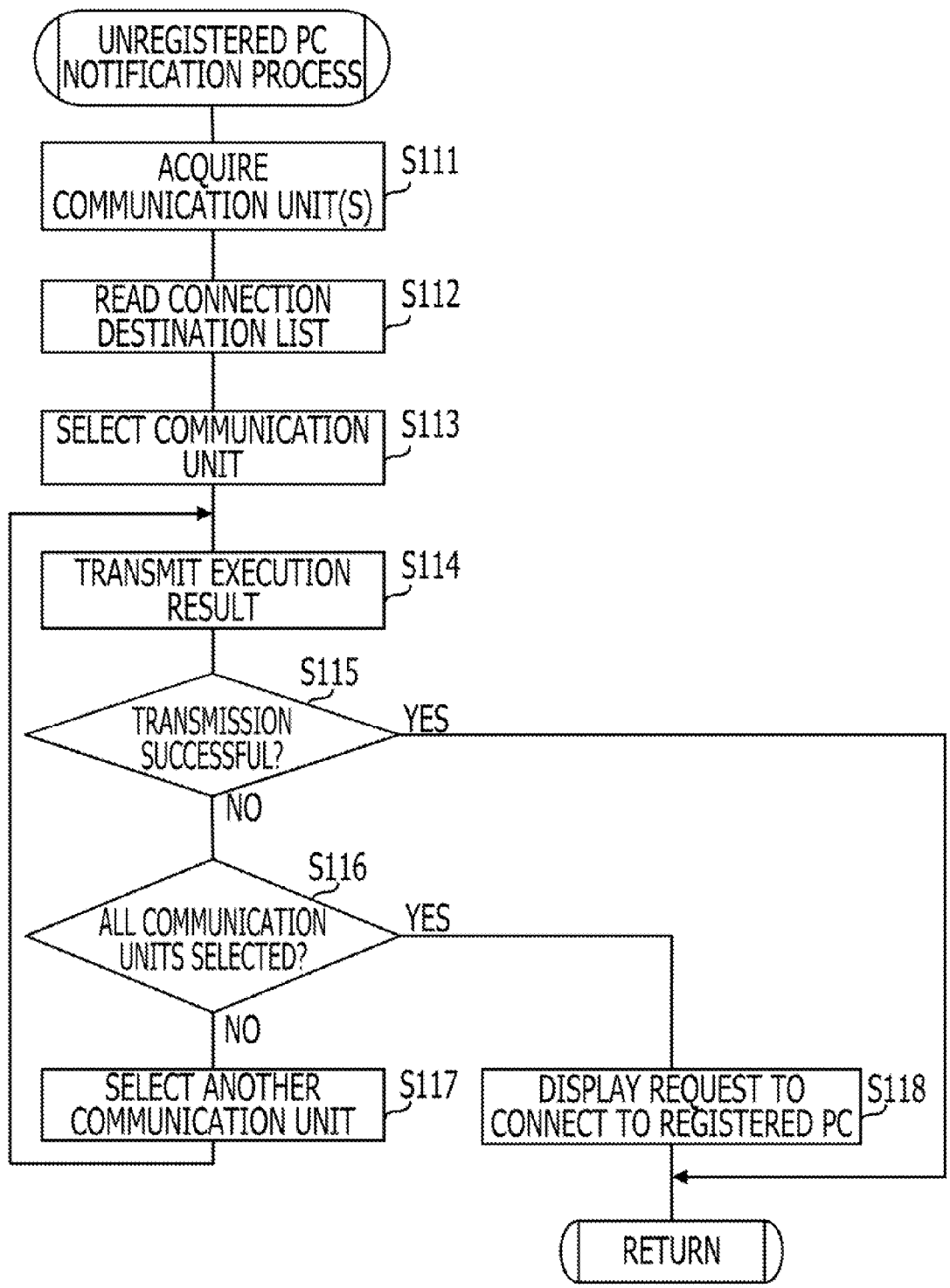
FIG. 15 is a flowchart illustrating an unregistered PC notification process according to a second embodiment.

FIG. 15 is a flowchart illustrating an unregistered PC notification process according to the second embodiment. In the unregistered PC notification process according to the first embodiment, a communication unit is selected based on the results of the acquired statuses of respective communication units included in the unregistered PC3. On the other hand, according to the second embodiment, each of the communication units are sequentially selected and notified to the server device 5. The unregistered PC notification process according to the second embodiment is executed at Operation S55 by the authentication program 21b illustrated in FIG. 9. The CPU20 acquires communication units included in the communication component 261 of the unregistered PC3 (Operation S111), and reads a connection destination list 21d from the authentication area 210A of the storage area 210 in the secure HDD21 (Operation S112).

The CPU20 selects one communication unit from the acquired communication units (Operation S113). The CPU20 transmits the execution result to the server device 5 using the selected communication unit (Operation S114). The CPU20 determines whether or not the transmission succeeds (Operation S115). When the CPU20 determines that the transmission fails (No at Operation S115), the CPU20 determines whether or not all of the effective communication units included in the communication component 261 of the unregistered PC3 are already selected (Operation S116).

When the CPU20 determines that not all of the effective communication units are selected (No at Operation S116), the CPU20 selects another communication unit (Operation S117), and returns to the Operation S114. When the CPU20 determines that all of the effective communication units are already selected (Yes at Operation S116), the CPU20 displays a request to connect to the registered PC2 in the display unit 271 (Operation S118), and completes the unregistered PC notification process. When the CPU20 determines that the transmission succeeds at Operation S115 (Yes at Operation S115), the CPU20 completes the unregistered PC notification process.

According to the embodiment, when the secure HDD21 executes a leakage prevention process, a plurality of communication units included in the unregistered PC3 and the registered PC2 are sequentially selected. An attempt is made to transmit the execution result of the leakage prevention process to the server device 5 using the selected communication units until the transmission succeeds. Accordingly, the possibility of a failure in transmitting a notification to the server 5 may be reduced.

The second embodiment is as described above, and other descriptions are substantially the same as those of the first embodiment. Thus, the same reference numerals and process names are applied to the corresponding elements and processes, and a detailed description will not be provided.

Figure 16:
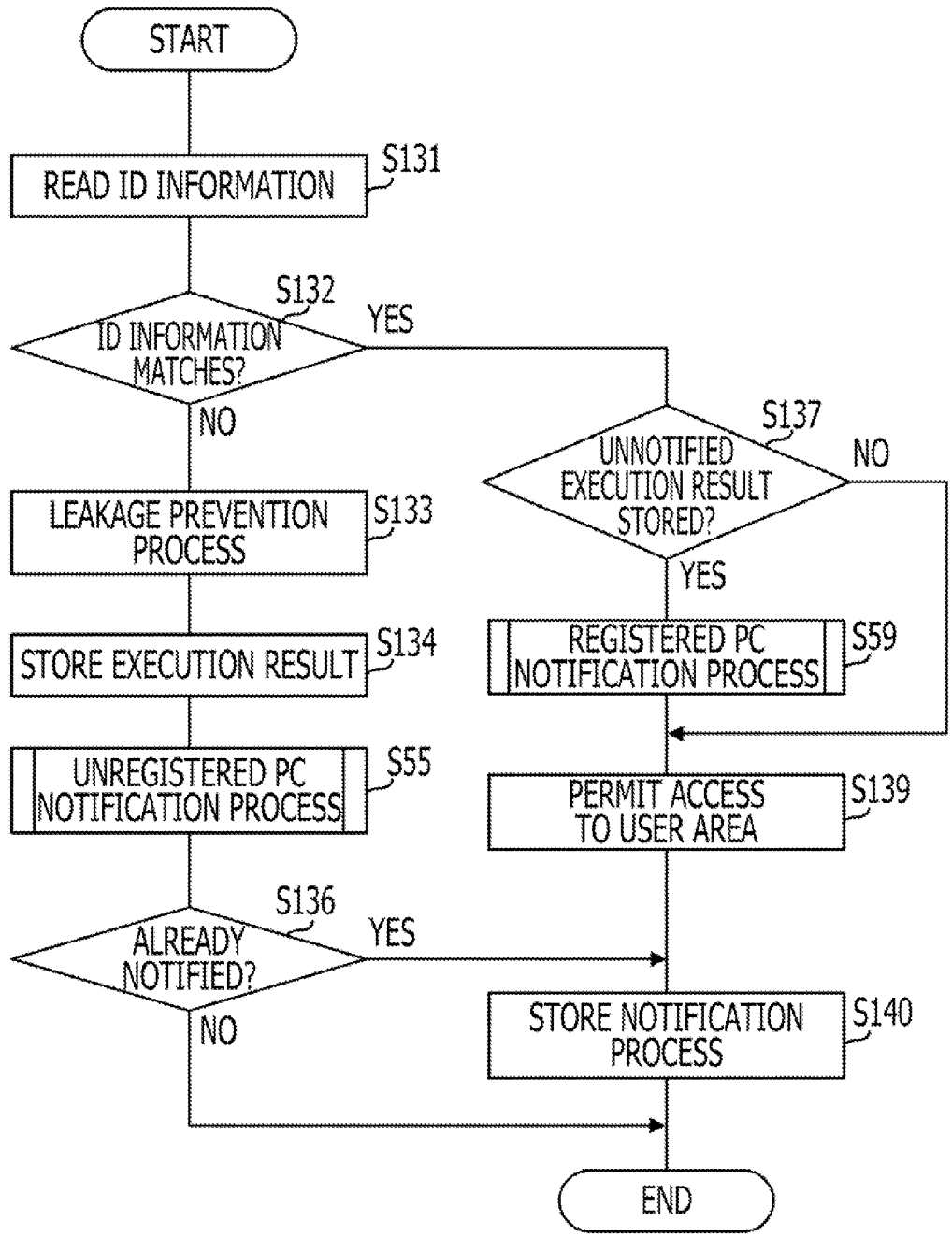
FIG. 16 is a flowchart illustrating a process of an authentication program according to a third embodiment.

FIG. 16 is a flowchart illustrating a process executed by a CPU 20 according to an authentication program 21b of the third embodiment. According to the first and the second embodiments, an execution result is deleted when a notification to the server device 5 succeeds, whereas according to the third embodiment, an execution result is maintained in the authentication area 210A of a storage unit 210. The CPU20 reads the ID information 251 stored in the NVRAM25 and the ID information stored in the authentication area of the storage unit 210 in the secure HDD21 (Operation S131). The CPU20 determines whether or not the two pieces of read ID information match (Operation S132).

When the CPU20 determines the two pieces of read ID information do not match (No at Operation S132), the CPU20 executes the leakage prevention process to the secure HDD21 (Operation S133). The CPU20 stores the execution result of the leakage prevention process in the authentication area 210A of the secure HDD21 (Operation S134). The CPU20 executes the unregistered PC notification process illustrated in FIG. 10 (Operation S55). The CPU20 determines whether or not a notification is already transmitted by the unregistered PC notification process (Operation S136). When the CPU20 determines that the notification is not transmitted (No at Operation S136), the CPU20 completes the process. At Operation S55 in FIG. 16, the unregistered PC notification process illustrated in FIG. 15 may be executed instead of the unregistered PC notification process illustrated in FIG. 10.

When the CPU20 determines that the notification is already transmitted (Yes at Operation S136), the CPU20 stores the notification result in the authentication area 210A of the secure HDD21 (Operation S140), and completes the process. The notification result may include, for example, information that indicates an execution result is transmitted to the server device 5. Moreover, the notification result may include information indicating the transmission date and time. When the CPU20 determines the two pieces of data match at Operation S132 (Yes at Operation S132), the CPU20 determines whether or not the execution result that is not transmitted is stored in the authentication area 210A of the secure HDD21 (Operation S137). When the execution result is stored in the authentication area 210A while the notification result is not stored in the authentication area 210A, the execution result may be determined to be not notified yet.

When the execution result is stored in the authentication area 210A while the notification result is stored in the authentication area 210A, whether or not the execution result is notified may be determined by referring to the notification result. When the CPU20 determines that the unsent execution result notification is stored (Yes at Operation S137), the CPU20 executes the registered PC notification process (Operation S59). The CPU20 permits access to the user area through the control unit 211 (Operation S139). Moreover, when the CPU20 determines the execution result that is not transmitted is not stored at Operation S137 (No at Operation S137), the CPU20 proceeds to Operation S139.

The CPU20 stores a notification result in the authentication area 210A of the secure HDD21 (Operation S140), and completes the process. As described above, even when an execution result is transmitted from the registered PC2 or the unregistered PC3 to the server device 5, the execution result is not deleted from, but is maintained in the authentication area 210A of the storage unit 210 in the secure HDD21. For example, when a stolen secure HDD21 is returned to a user who operates a registered PC2, the execution results and notification results stored in the authentication area 210A of the storage unit 210 in the secure HDD21 may be read.

The third embodiment is as described above, and other descriptions are substantially the same as those of the first and the second embodiments. Thus, the same reference numerals and process names are applied to the corresponding elements and processes, and a detailed description will not be provided.

Figure 17:
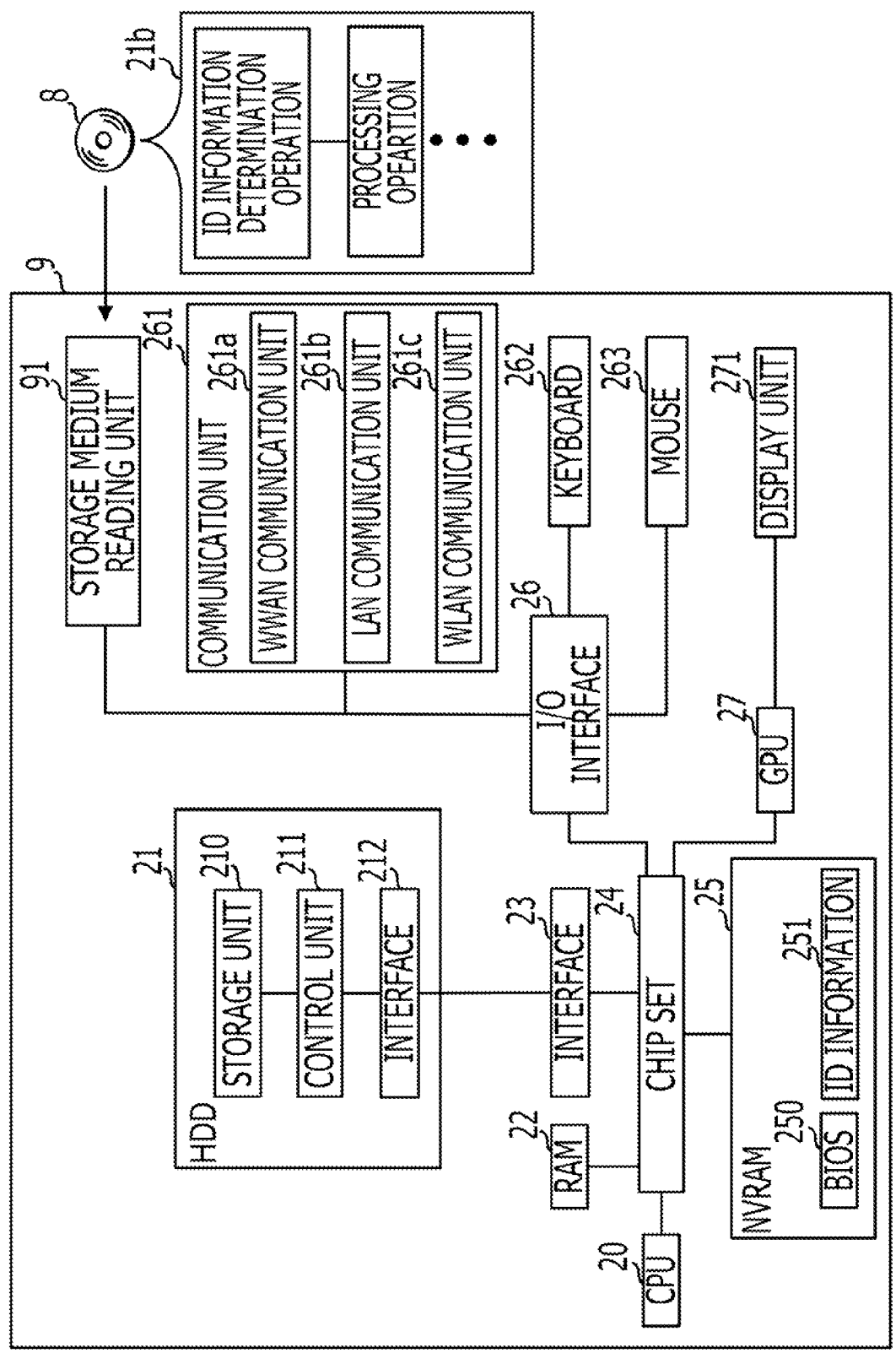
FIG. 17 is a block diagram illustrating hardware and functions of a registered PC according to a fourth embodiment.

FIG. 17 is a block diagram illustrating the hardware and functions of a registered PC according to a fourth embodiment. According to the fourth embodiment, an authentication program 21b that is read from a storage unit 8 is stored in the storage unit 210 of the secure HDD21, whereas according to the first embodiment, the authentication program 21b is stored in the storage unit 210 of the secure HDD21. A registered PC9 includes a storage medium reading unit 91. A CPU20 reads the authentication program 21b from the storage unit 8 inserted into the storage media reading unit 91 and stores the authentication program 21b in an authentication area 210A of the storage unit 210 in the secure HDD21. Storing the authentication program 21b into the authentication area 210A may be performed, for example, when performing the registration process illustrated in FIG. 7. The CPU20 determines whether or not the ID information 251 read from the NVRAM25 matches with ID information stored in the authentication area 210A of the storage unit 210 in the secure HDD21. When the CPU20 determines the two pieces of information do not match, the CPU20 applies the leakage prevention process to the secure HDD21. The CPU20 acquires communication units included in a communication component 261 and selects a communication unit based on the statuses of respective communication units. The CPU20 notifies an execution of the leakage prevention process to a server device 5 by using the selected communication unit.

The authentication program 21b is not limited to that read from the storage unit 8, but may be an authentication program 21b that is obtained by establishing communication with an external computer, which is not illustrated, and downloading to the storage unit 210 of the secure HDD21.

The fourth embodiment is as described above, and other descriptions are substantially the same as those of the first to the third embodiments. Thus, the same reference numerals and process names are applied to the corresponding elements and processes, and a detailed description will not be provided.

The embodiments may be implemented in computing hardware (computing apparatus) and/or software, such as (in a non-limiting example) any computer that can store, retrieve, process and/or output data and/or communicate with other computers. The results produced may be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of transmission communication media includes a carrier-wave signal. However, the media described above may be non-transitory media.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A non-transitory computer-readable medium for recording a program allowing a computer to:
   execute a process for determining whether first identification information of the computer matches with second identification information stored in the computer-readable medium connected to the computer;
   execute a process for protecting data stored in the computer-readable medium when it is determined that the first identification information and the second identification information do not match;
   execute a process for selecting a communication interface included in the computer to transmit a notification that the process for protecting the data has been executed and controlling the selected communication interface based on a network driver stored in the non-transitory computer-readable medium to transmit the notification, wherein
   the computer-readable medium is one of a hard disk drive and a Universal Serial Bus (USB) memory drive configured to be removably connected to the computer;
   acquire statuses of one or more communication interfaces included in the computer; and
   select the communication interface based on the acquired statues.

2. The non-transitory computer-readable medium according to claim 1, wherein
   the process for selecting includes selecting the communication interface from one or more communication interfaces included in the computer and one or more communication interfaces included in a different computer to which the computer-readable medium is not connected, and
   the program further allowing the computer to:
      store information regarding the execution of the process for protecting the data into the computer-readable medium when the communication interface included in the different computer is selected.

3. The non-transitory computer-readable medium according to claim 1, wherein
   the process for selecting includes selecting the communication interface from one or more communication interfaces included in the computer and one or more communication interfaces included in a different computer to which the computer-readable medium is not connected, and
   the program further allowing the computer to:
      output a message prompting to connect the computer-readable medium to the different computer when the communication interface included in the different computer is selected.

4. The non-transitory computer-readable medium according to claim 2, wherein the program further allowing the computer to:
   determine whether the information regarding the execution of the process for protecting the data is stored in the computer-readable medium; and
   control transmitting the information regarding the execution of the process for protecting the data via the selected communication interface included in the different computer when it is determined that the information regarding the execution of the process for protecting the data is stored.

5. The non-transitory computer-readable medium according to claim 1, wherein the program further allowing the computer to:
   read an address of a transmission destination to which information regarding the execution of the process for protecting the data is to be transmitted from a plurality of information regarding addresses to which the computer is accessible through a network, and which is stored in the computer-readable medium.

6. A data processing system comprising:
   a storage device; and
   a computer connected to the storage device, the computer including
      one or more communication interfaces, and
      a processor configured to
         execute a process stored in the storage device for determining whether first identification information of the computer matches with second identification information stored in the storage device,
         execute a process stored in the storage device for protecting data stored in the storage device when it is determined that the first identification information and the second identification information do not match
         execute a process stored in the storage device for selecting a communication interface from the one or more communication interfaces to transmit a notification that the process for protecting the data has been executed and controlling the selected communication interface based on a network driver stored in the storage device to transmit the notification, wherein the storage device is one of a hard disk drive and a Universal Serial Bus (USB) memory drive configured to be removably connected to the computer,
         select the communication interface from the one or more communication interfaces included in the computer and one or more communication interfaces included in a different computer to which the storage device is not connected, and store, when the processor selects the communication interface included in the different computer, information regarding the execution of the process for protecting the data into the storage device.

7. The data processing system according to claim 6, wherein the processor is further configured to:

acquire statuses of the one or more communication interfaces; and select the communication interface based on the acquired statuses.

8. The data processing system according to claim 6, wherein the processor is configured to:

select the communication interface from the one or more communication interfaces included in the computer and one or more communication interfaces included in a different computer to which the storage device is not connected; and control a display device to output a message prompting to connect the storage device to the different computer when the communication interface included in the different computer is selected.

9. A data processing system comprising:

a storage device; and a computer connected to the storage device, the computer including one or more communication interfaces, a processor configured to execute a process stored in the storage device for determining whether first identification information of the computer matches with second identification information stored in the storage device, execute a process stored in the storage device for protecting data stored in the storage device upon determining that the first identification information and the second identification information do not match, and execute a process for selecting a communication interface from the one or more communication interfaces included in the computer and one or more communication interfaces included in a different computer to which the storage device is not connected to transmit a notification that the process for protecting the data has been executed, and a display device configured to output a message prompting to connect the storage device to the different computer when the communication interface included in the different computer is selected, wherein the processor is configured to control the selected communication interface based on a network driver stored in the storage device to transmit the notification when the storage device is connected to the different computer.

10. A non-transitory computer-readable medium including a program causing a computer to:

drive a communication of a computer connected to the non-transitory computer-readable medium based on a network driver stored in the non-transitory computer-readable medium when it is determined that the computer is not permitted to access data stored in the non-transitory computer-readable medium;

output a notification that a process of protecting the data stored in the computer-readable medium has been executed via the driven communication function of the computer when it is determined that the computer is not allowed to access the data, wherein the computer-readable medium is one of a hard disk drive and a Universal Serial Bus (USB) memory drive configured to be removably connected to the computer;

acquire statuses of one or more communication interfaces included in the computer; and select a communication interface based on the acquired statuses.

11. A method comprising:

driving a communication function of a computer connected to a non-transitory computer-readable medium based on a network driver stored in the non-transitory computer-readable medium when it is determined that the computer is not permitted to access data stored in the non-transitory computer-readable medium;

outputting a notification that a process of protecting the data stored in the computer-readable medium has been executed via the driven communication function of the computer when it is determined that the computer is not allowed to access the data, wherein the computer-readable medium is one of a hard disk drive and a Universal Serial Bus (USB) memory drive configured to be removably connected to the computer;

acquiring statuses of one or more communication interfaces included in the computer, and selecting a communication interface based on the acquired statuses.

* * * * *